United States Patent
Kanai et al.

[19]

[11] Patent Number: 5,978,182
[45] Date of Patent: Nov. 2, 1999

[54] MAGNETORESISTIVE HEAD WITH SPIN VALVE CONFIGURATION

[75] Inventors: Hitoshi Kanai; Yoshifumi Mizoshita; Junichi Kane; Kenichi Aoshima, all of Kanagawa, Japan

[73] Assignee: Fujitsu Limited, Kawasaki, Japan

[21] Appl. No.: 08/971,102

[22] Filed: Nov. 14, 1997

Related U.S. Application Data

[62] Division of application No. 08/503,006, Jul. 17, 1995.

[30] Foreign Application Priority Data

| Sep. 8, 1994 | [JP] | Japan | 6-214845 |
| Dec. 22, 1994 | [JP] | Japan | 6-320432 |
| Mar. 7, 1995 | [JP] | Japan | 7-47603 |

[51] Int. Cl.[6] .................................................. G11B 5/39
[52] U.S. Cl. ............................................................. 360/113
[58] Field of Search ....................... 360/113; 324/207.21, 324/252; 338/32 R

[56] References Cited

U.S. PATENT DOCUMENTS

| 4,949,039 | 8/1990 | Grünberg | 324/252 |
| 5,134,533 | 7/1992 | Friedrich et al. | 360/113 |
| 5,155,642 | 10/1992 | Voegeli | 360/113 |
| 5,206,590 | 4/1993 | Dieny et al. | 324/252 |
| 5,287,238 | 2/1994 | Baumgart et al. | 360/113 |
| 5,343,422 | 8/1994 | Kung et al. | 360/113 |
| 5,408,377 | 4/1995 | Gurney et al. | 360/113 |
| 5,508,866 | 4/1996 | Gill et al. | 360/113 |
| 5,508,867 | 4/1996 | Cain et al. | 360/113 |
| 5,576,915 | 11/1996 | Akiyama et al. | 360/113 |
| 5,585,986 | 12/1996 | Parkin | 360/113 |

FOREIGN PATENT DOCUMENTS

| 61-296522 | 12/1986 | Japan . |
| 62-234218 | 10/1987 | Japan . |
| 4-498809 | 10/1992 | Japan . |
| 6-60336 | 3/1994 | Japan . |
| 6-111252 | 4/1994 | Japan . |

OTHER PUBLICATIONS

Mee et al, 4.3.2 Magnetic alloys, "Magnetic Recording Handbook", pp. 290–291, 1990.

*Primary Examiner*—Craig A. Renner
*Assistant Examiner*—David D. Davis
*Attorney, Agent, or Firm*—Greer, Burns & Crain Ltd.

[57] ABSTRACT

The present invention relates to a magnetoresistive head capable of converting a change in a magnetic field generated by a magnetic recording medium into a change in electric resistivity by utilizing spin valve magnetoresistance effect to read signal information. The magnetoresistive head comprises a first magnetic layer, a second magnetic layer formed on the first magnetic layer through a first nonmagnetic metal layer and magnetized in one direction, a third magnetic layer formed on the second magnetic layer through a second nonmagnetic metal layer, and an electric current supplying layer for applying a constant current to at least the third magnetic layer, the second nonmagnetic metal layer and the second magnetic layer in one of the same direction as and the opposite direction to the direction of magnetization of the second magnetic layer.

9 Claims, 14 Drawing Sheets

→ ; direction of magnetization

→ ; direction of magnetization

M1, M2 →: direction of magnetization

M3, M4, M5 →: direction of magnetization

M6, M7, M8 ⟶ : direction of magnetization

MAGNETORESISTIVE HEAD WITH SPIN VALVE CONFIGURATION

This is a divisional of copending application Ser. No. 08/503,006 filed on Jul. 17, 1995.

BACKGROUND OF THE INVENTION

1. Field of the Invention

The present invention relates to a magnetoresistive head and, more particularly, a magnetoresistive head capable of reading signal information by converting a change in magnetic field generated from a magnetic recording medium into a change in electric resistivity by use of spin valve magnetoresistance effect, upon reading information signal from the magnetic recording medium.

2. Description of the Prior Art

As a device for reading information signals from the magnetic recording medium such as a hard disk, a magnetic card, a magnetic tape, the magnetoresistive head employing the spin valve magnetoresistance effect has been proposed in Patent Application Publication (KOKAI) U.S. Pat. No. 5,206,590.

The magnetoresistive head has a structure shown in FIGS. 1A and 1B, for example.

In FIGS. 1A and 1B, a lower ferromagnetic layer 2, a nonmagnetic metal layer 3, an upper ferromagnetic layer 4, and an antiferromagnetic layer 5 are formed in that order on a substrate 1 having large electric resistance. Respective layers from the lower ferromagnetic layer 2 to the antiferromagnetic layer 5 have a plane rectangular shape. In addition, a pair of lead electrodes 6a, 6b are formed in the longitudinal direction at a distance on the antiferromagnetic layer 5, thus completing a magnetoresistive head. As materials constituting these layers, an iron-manganese (NiFe) is used as upper and lower ferromagnetic layers 2, 4, a copper (Cu) is used as the antimagnetic metal layer 3, and an iron-manganese (FeMn) is used as the antiferromagnetic layer 5, for example. In FIGS. 1A and 1B, a Z-axis denotes the direction of film thickness.

The upper ferromagnetic layer 4 is magnetized by exchange coupling of the antiferromagnetic layer 5, and the direction of magnetization is a width direction (an X axis direction in FIG. 1B). The lower ferromagnetic layer 2 is magnetized in the longitudinal direction (a Y axis direction in FIG. 1B). It is preferable that the direction of magnetization of the lower ferromagnetic layer 2 intersects orthogonally the direction of magnetization of the upper ferromagnetic layer 4 if the external signal magnetic field is zero. The external signal magnetic field is a magnetic field generated from the magnetic recording medium, and is generated in the width direction of each layer (an X axis direction). The direction of magnetization of the upper ferromagnetic layer 4 is perpendicular to the surface of the magnetic recording medium whereas the direction of magnetization of the lower ferromagnetic layer 2 is formed along the surface of the magnetic recording medium.

If the external signal magnetic field is applied to such spin valve magnetoresistive head, the direction of magnetization of the lower ferromagnetic layer 2 is inclined at an angle corresponding to the strength and direction of the external signal magnetic field.

A component of the direction of magnetization of the lower ferromagnetic layer 2 in the direction opposite to the direction of magnetization of the upper ferromagnetic layer 4 causes scattering of electrons passing through these layers, thus increasing electric resistance of entire layers. On the other hand, a component of the direction of magnetization of the lower ferromagnetic layer 2 in the same direction as the direction of magnetization of the upper ferromagnetic layer 4 decreases scattering of electrons passing through these layers, thus decreasing electric resistance of entire layers.

The electric resistance of the sense current area S is changed in proportion to cosine of angle difference $\theta$ between the direction of magnetization of the lower ferromagnetic layer 2 and the direction of magnetization of the upper ferromagnetic layer 4, i.e., $\cos\theta$.

In addition, in order to change the electric resistance to the signal magnetic field generated from the magnetic recording medium linearly, the direction of magnetization of the lower ferromagnetic layer 2 is intersected with the direction of magnetization of the upper ferromagnetic layer 4 under the condition that the external signal magnetic field is zero. This signal magnetic field is applied to the same direction as or the opposite direction to the direction of magnetization of the upper ferromagnetic layer 4, i.e., the fixed direction of magnetization.

Thereby, as shown in FIG. 1C, a relation between the external signal magnetic field H and the electric resistance $\Delta R[R(H)-Ro(H=0)]$ can be derived.

In case the signal magnetic field generated by the magnetic recording medium is converted into an electric signal, a change in the electric resistance due to the signal magnetic field can be converted into a change in electric voltage by passing a constant current between a pair of lead electrodes 6a, 6b. The change of the voltage is used as a reproducing electric signal. This is the same in the embodiments described hereinafter.

In addition, a width of a sense area S which reads a signal magnetic field by a spin valve magnetoresistance effect has been defined by a distance between the pair of lead electrodes 6a, 6b.

However, according to the laminated layer structure shown in FIG. 1A, a leakage magnetic field from a side portion of the upper ferromagnetic layer 4 enters into a side portion of the lower ferromagnetic layer 2 and acts as a bias magnetic field even when the external signal magnetic field is in a zero state.

Therefore, the direction of magnetization of the lower ferromagnetic layer 2 made of a soft magnetic material is inclined by the leakage magnetic field, so that the direction of magnetization of the lower ferromagnetic layer 2 does not intersect orthogonally with the magnetization of the upper ferromagnetic layer 4. As a result, there is caused a drawback that the electric resistance (specific resistance) cannot change linearly with respect to the signal magnetic field and thus the voltage waveform as a reproducing signal is distorted.

On the contrary, a magnetoresistive head wherein the direction of magnetization of the upper magnetic layer is not fixed and varied by the external signal magnetic field along with the direction of magnetization of the lower magnetic layer has been set forth in Patent Application Publication (KOKAI) 2-61572. But, although influence of the leakage magnetic field from the ferromagnetic layer need not be considered, there is no recitation in this Publication how to adjust a relative angle between directions of magnetization of two ferromagnetic layers concretely. In practice, it is hard to operate the magnetoresistive head linearly by intersecting directions of magnetization of these layers with each other.

As shown in FIG. 2, a signal magnetic field $H_t$ of a track adjacent to the magnetic recording medium beneath the lead electrode 6a leaks into the sense area S via soft magnetic layers 2, 4 formed immediately below the lead electrodes 6a, 6b. Therefore, there has been caused another drawback that noise enters into a reproducing electric signal.

In addition, the sense area S must be defined essentially by the distance between two lead electrodes 6a, 6b. However, the spin valve magnetoresistance effect is in practice caused in a wider area than that defined by the distance between two lead electrodes 6a, 6b. Thus, there has been caused another drawback that the sense area for reading the signal magnetic field becomes vague, so that it is difficult to clearly define the sense area.

SUMMARY OF THE INVENTION

An object of the present invention is to provide a magnetoresistive head capable of eliminating distortion in an output characteristic of a change in electric resistance caused by the signal magnetic field.

Another object of the present invention is to provide a magnetoresistive head capable of defining the width of the sense area for reading the signal magnetic field with precision, and also suppressing the noise from entering into the reproducing electric signal.

According to an aspect of the present invention, a first magnetic layer, a second magnetic layer and a third magnetic layer are formed through nonmagnetic metal layers in order to separate magnetically, and a sense electric current is supplied to at least the second magnetic layer and the third magnetic layer and the second nonmagnetic metal layer interposed therebetween in the same direction as and the opposite direction to the direction of magnetization of the second magnetic layer.

Therefore, the first magnetic layer and the third magnetic layer are magnetized in the direction perpendicular to the direction of magnetization of the second magnetic layer by the magnetic field generated by the sense current therearound. Since normally this sense current is constant current, the strength of magnetization is not changed. Only the direction of magnetization of the second magnetization layer is rotated by the signal magnetic field from the magnetic recording medium.

In this case, the first and third magnetic layers are magnetized by the sense current and coupled magnetostatically to each other. Therefore, since the leakage magnetic fields leaked from the side portions of the first and third magnetic layers can be coupled mutually, they are never applied to the second magnetic layer.

In addition, since, under the condition where the sense current is flowing and there is no signal magnetic field from the magnetic recording medium, the direction of magnetization of the second magnetic layer is intersected orthogonally with at least the direction of magnetization of the third magnetic layer, the change rate of the electric resistance can change linearly with respect to the change of the signal magnetic field, and thus there is caused no distortion of the voltage waveform at the time of reproducing.

If the sense current can be flown in all layers from the first magnetic layer to the third magnetic layer by reducing the specific resistance of the first and second nonmagnetic metal layers, the spin valve magnetoresistance effect is caused in the first, second and third magnetic layers. Therefore, the change of the electric resistance can be increased to thus improve the reproducing sensitivity.

In this case, if the product of the saturation magnetization of the first magnetic layer and its film thickness and the product of the saturation magnetization of the third magnetic layer and its film thickness are set to be equal to each other, these layers are balanced magnetically and become stable.

According to the present invention, the first soft magnetic layer and the second soft magnetic layer, both being magnetized in the opposite direction to each other, are laminated via the nonmagnetic layer, and the magnetization direction adjusting layer which generates the magnetic field intersecting orthogonally with the easy magnetization axis of the first and second soft magnetic layers is formed. Thereby, since the magnetization of the first and second soft magnetic layers can be rotated to intersect orthogonally with each other, a linear characteristic of the change of the specific resistance without distortion can be derived with respect to the signal magnetic field.

In addition, since the magnetization direction adjusting layer is formed on the first soft magnetic layer, miniaturization of the magnetoresistive head is never interrupted.

As the magnetization direction adjusting layer, there is the nonmagnetic layer formed on the first soft magnetic layer via the insulating layer. The magnetic field which rotates magnetization of the first and second soft magnetic layers to thus intersect them with each other is generated by flowing the electric current in the nonmagnetic metal layer. According to this structure, the directions of magnetization of the first and second soft magnetic layers can be finely adjusted by controlling the magnitude of the current.

In another magnetization direction adjusting layer, the hard magnetic layer is formed on the first soft magnetic layer via the insulating layer or the nonmagnetic layer, and the hard magnetic layer is magnetized in the direction perpendicular to magnetization of the first and second soft magnetic layers. According to this structure, magnetization of the first and second soft magnetic layers is rotated from the easy magnetization axis by the leakage magnetic field of the hard magnetic layer.

In still another magnetization direction adjusting layer, the third soft magnetic layer is formed on the first soft magnetic layer via the insulating layer or the nonmagnetic layer, and the third soft magnetic layer is magnetized by the magnetic field generated by the constant current supplied to the first and second soft magnetic layers in the direction perpendicular to magnetization of the first and second soft magnetic layers. The magnetization of the first and second soft magnetic layers is rotated from the easy magnetization axis by the bias magnetic field generated by the third soft magnetic layer.

According to the present invention, the nonmagnetic metal layer formed between the first soft magnetic layer and the second soft magnetic layer is formed only in the sense area. Therefore, since the area wherein the spin valve magnetoresistance effect is caused can be determined by the nonmagnetic metal layer forming region, the sense area can be defined precisely. As a result, noise generated by the magnetic filed entering into the peripheral area of the sense area can be reduced.

In addition, the film thickness on both sides of the sense area in the nonmagnetic metal layer formed between the first soft magnetic layer and the second soft magnetic layer is made thick. Therefore, since the spin valve magnetoresistance effect is scarcely caused on both sides of the sense area, the sense area can be defined with accuracy by the forming region of the thin nonmagnetic metal layer. As a result, noise generated by the magnetic filed entering into the peripheral area of the sense area can be reduced.

In addition, if the nonmagnetic metal layer formed on both sides of the sense area is formed thickly such that the nonmagnetic metal layer can be used as the lead electrode, the thinner spin valve magnetoresistive head may be formed.

Moreover, the first soft magnetic layer, on which the antiferromagnetic layer is not formed, of the first and second soft magnetic layers formed on and under the non-magnetic metal layer is formed only in the sense area. Therefore, since the spin valve magnetoresistance effect is not caused on both sides of the sense area, the sense area can be defined with accuracy by the forming region of the first nonmagnetic metal layer. As a result, noise generated by the magnetic field entering into the peripheral area of the sense area can be reduced.

DESCRIPTION OF THE PREFERRED EMBODIMENTS

There will now be described preferred embodiments of the present invention hereinafter with reference to the accompanying drawings.

First Embodiment

Figure 1A:
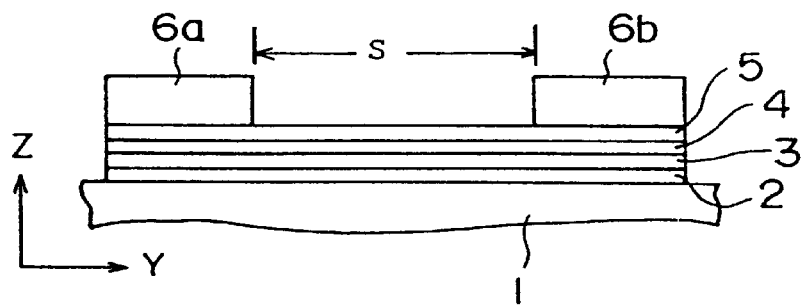
FIG. 1A is a side view showing a conventional spin valve magnetoresistive head.
Figure 1B:
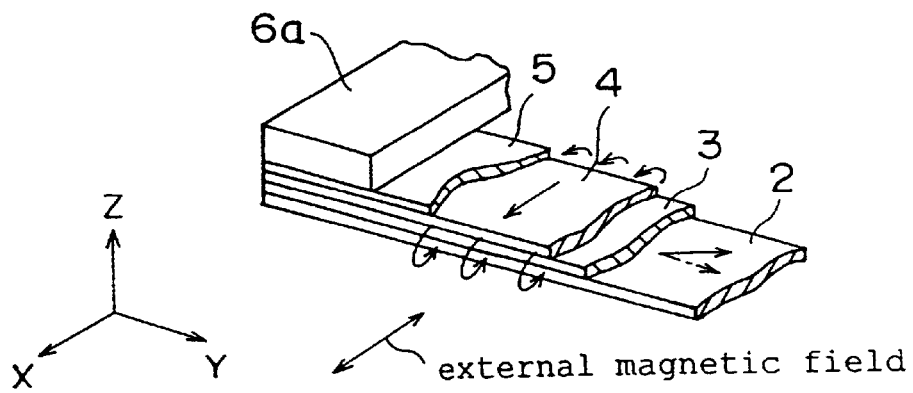
FIG. 1B is a perspective view showing the conventional spin valve magnetoresistive head in FIG. 1A.
Figure 1C:
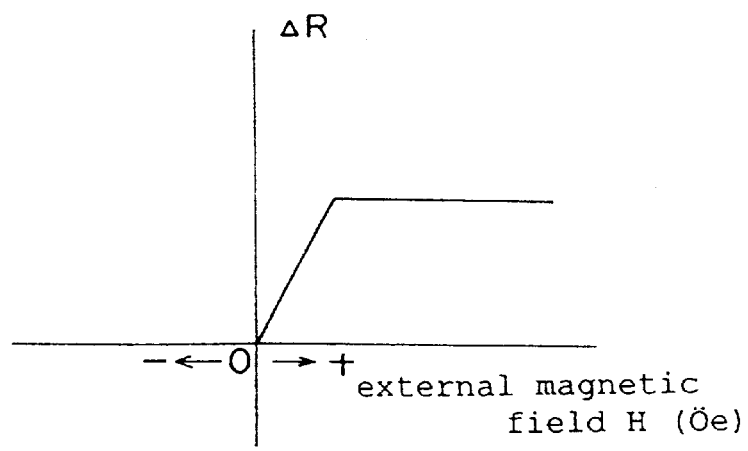
FIG. 1C is a characteristic view showing a relation between an external signal magnetic field and resistance.
Figure 2:
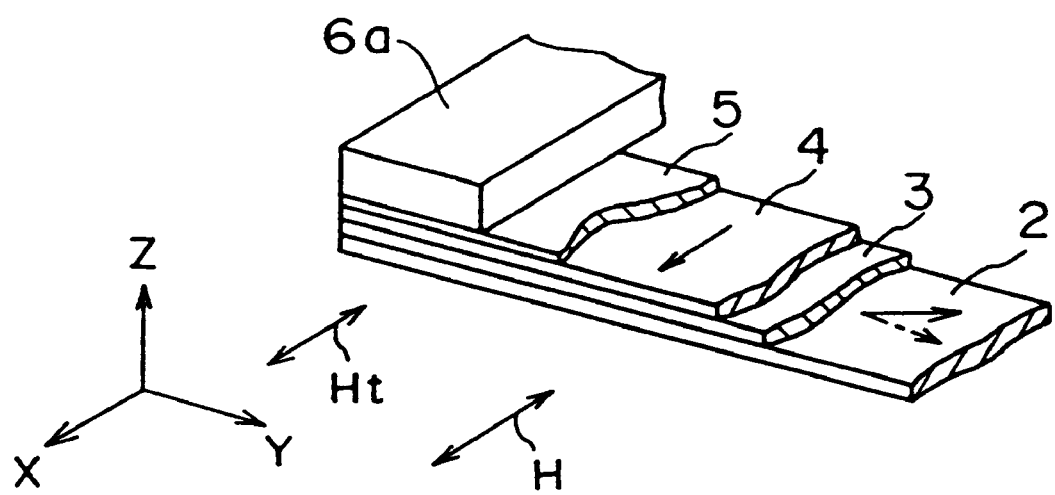
FIG. 2 is a sectional view showing part of a spin valve magnetoresistive head according to a conventional example.
Figure 3A:
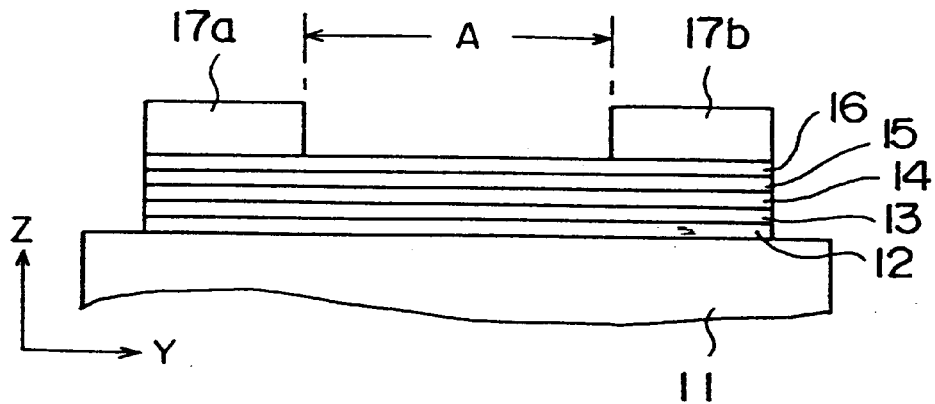
FIG. 3A is a side view showing a magnetoresistive head according to a first embodiment of the present invention.
Figure 3B:
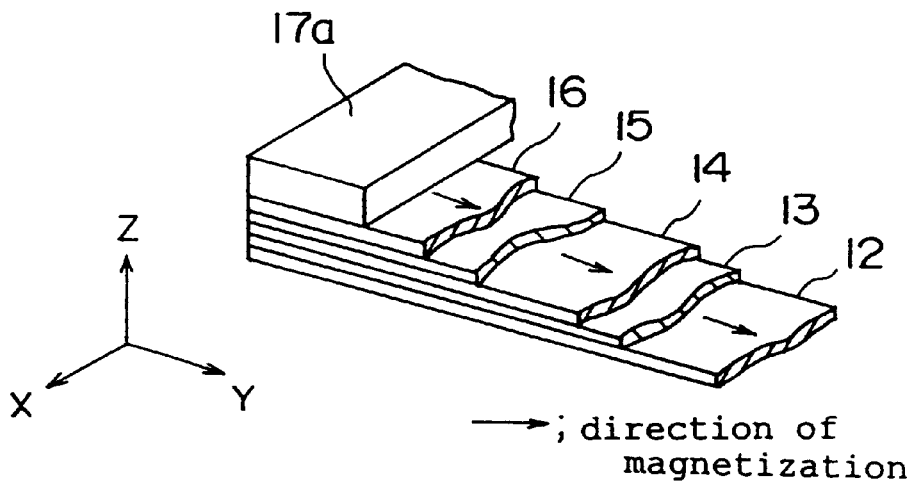
FIG. 3B is a perspective view showing part of a laminated structure of the magnetoresistive head in FIG. 3A.

FIG. 3A is a sectional view showing a magneto-resistance transducer according to a first embodiment of the present invention. FIG. 3B is a perspective view showing the magnetoresistive head in FIG. 3A.

As shown in FIGS. 3A and 3B, a first magnetic layer 12 having a film thickness of 5 to 10 nm, a first nonmagnetic metal layer 13 having a film thickness of 5 to 10 nm, a second magnetic layer 14 having a film thickness of 3 to 10 nm, a second nonmagnetic metal layer 15 having a film thickness of 2 to 4 nm, and a third magnetic layer 16 having a film thickness of 3 to 10 nm are formed in that order on a substrate 11 having large electric resistance.

Respective layers from the first magnetic layer 12 to the third magnetic layer 16 are grown by sputtering, evaporation etc. in the same vacuum chamber. When being grown, the first magnetic layer 12, the second magnetic layer 14 and the third magnetic layer 16 are magnetized by external magnetic fields from the particular direction. In addition, respective layers from the first magnetic layer 12 to the third magnetic layer 16 are patterned by ion milling using a resist mask (not shown) to have a rectangular plane shape. As shown in FIG. 3B, the rectangular plane shape has the direction of magnetization in the longitudinal direction, and has a long side (y axis direction) of 10 to 100 μm and a short side (x axis direction) of 1 to 5 μm. The direction of the short side is also referred to as the width direction hereinbelow. The z axis direction is set to the direction of the film thickness.

The first magnetic layer 12 is formed with a soft magnetic material which is made of, for example, either one of an iron-nickel (NiFe) film; the NiFe film into which an element such as chromium (Cr), niobium (Nb), molybdenum (Mo) or vanadium (V) is added; a simple substance film of cobalt (Co) or nickel (Ni) or an alloy film including cobalt (Co) or nickel (Ni); an iron (Fe) film; and a Co system amorphous film.

The first nonmagnetic metal layer 13 is formed with a material such as tantalum (Ta) or titanium (Ti) which has larger electric resistivity (specific resistance) than that of the second magnetic layer 14. The second magnetic layer 14 is formed with a soft magnetic material such as NiFe. The second nonmagnetic metal layer 15 is formed with a metal such as copper (Cu) or gold (Au) which has small specific resistance. The third magnetic layer 16 is formed with a material such as NiFe or cobalt which has specific resistance equal to or larger than that of the second magnetic layer 14. The first nonmagnetic metal layer 13 and the second nonmagnetic metal layer 15 are provided to isolate magnetically the first magnetic layer 12, the second magnetic layer 14 and the third magnetic layer 16, respectively.

In addition, on the third magnetic layer 16, a first and second lead electrodes (electric current supplying layers) 17a and 17b are formed by a lift-off method so as to put a sense area A therebetween in the longitudinal direction. The first and second lead electrodes 17a and 17b are formed with an Au film having a thickness of 100 to 200 nm.

In the magnetoresistive head so constructed as aforementioned, when a signal magnetic field $H_{sig}$ is read from a magnetic medium, sense current I is supplied to the sense area A formed between the first and second lead electrodes 17a and 17b by connecting the electrodes 17a and 17b to a constant current source (not shown). The sense current I is flown in the direction either identical to the direction of magnetization of the second magnetic layer 14 or opposite thereto.

Figure 3C:
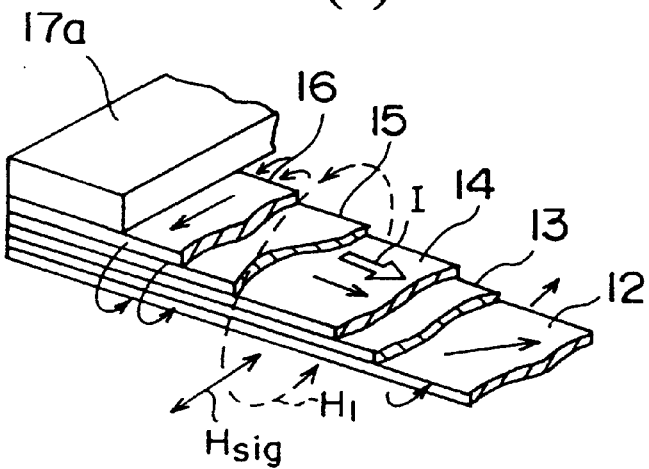
FIG. 3C is a perspective view showing a relation between electric current and a magnetic field in case a sense current is supplied to the magnetoresistive head in FIG. 3A.

Consequently, as shown in FIG. 3C, the first magnetic layer 12 and the third magnetic layer 16 are mutually coupled magnetostatically by a magnetic field $H_1$ (shown by a broken line in FIG. 3C) which is generated by the sense current I based on an Ampere's right-handed screw rule.

Therefore, as shown by a solid line arrow in FIG. 3C, leakage magnetic fields leaked out from a side portion of the first magnetic layer 12 and a side portion of the third magnetic layer 16 are coupled, and thus they cannot enter into the second magnetic layer 14 formed between the first magnetic layer 12 and the third magnetic layer 16. In addition, since a magnetic field $H_1$ is generated by the sense current I therearound in the direction perpendicular to the direction of magnetization of the second magnetic layer 14, at least the direction of magnetization of the third magnetic layer 16 is changed by the magnetic field $H_1$, as shown in FIG. 3C, so as to intersect orthogonally the direction of magnetization of the second magnetic layer 14. The direction of magnetization of the first magnetic layer 12 is directed in the opposite direction to the direction of magnetization of the third magnetic layer 16. According to the material of the first magnetic layer 12, the direction of magnetization of the first magnetic layer 12 is opposed to the direction of magnetization of the third magnetic layer 16 or is slightly inclined against the direction of magnetization of the third magnetic layer 16.

Thereby, under the condition wherein there exists no signal magnetic field $H_{sig}$ generated by a magnetic recording medium, the direction of magnetization of the third magnetic layer 16 is orthogonally intersected with the direction of magnetization of the second magnetic layer 14. In response to a change in the signal magnetic field $H_{sig}$, the direction of magnetization of the second magnetic layer 14 is rotated. However, since at least the third magnetic layer 16 is magnetized in the width direction, the direction of magnetization of the third magnetic layer 16 is not rotated by the change in the signal magnetic field $H_{sig}$.

Accordingly, no distortion in the change in the specific resistance of the second magnetic layer 14 and the third magnetic layer 16 is caused by the signal magnetic field $H_{sig}$. As a result, there is no distortion in output voltage which is converted into a reproducing signal.

Since the first nonmagnetic metal layer 13 formed between the first magnetic layer 12 and the second magnetic layer 14 has large specific resistance, electric current hardly flows in the first magnetic layer 12. As a result, the spin valve magnetoresistance effect cannot be generated in the first magnetic layer 12.

Second Embodiment

A magnetoresistive head according to a second embodiment of the present invention is so constituted that the second nonmagnetic metal layer interposed between the first magnetic layer and the second magnetic layer in the first embodiment is formed with a material having small electric resistance.

Figure 4A:
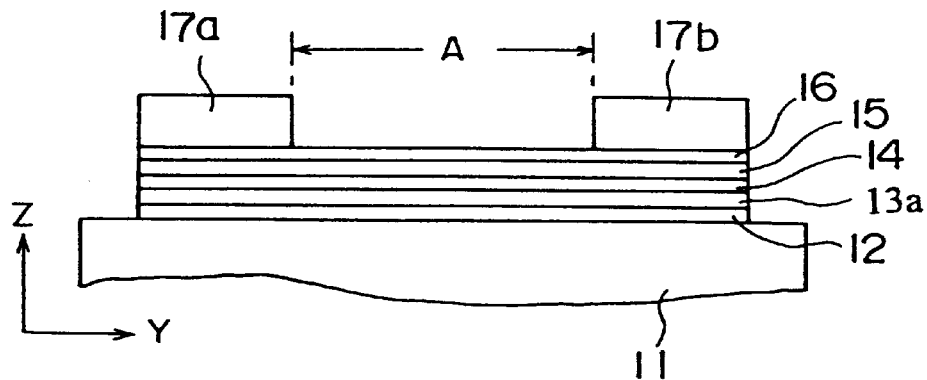
FIG. 4A is a side view showing a magnetoresistive head according to a second embodiment of the present invention.
Figure 4B:
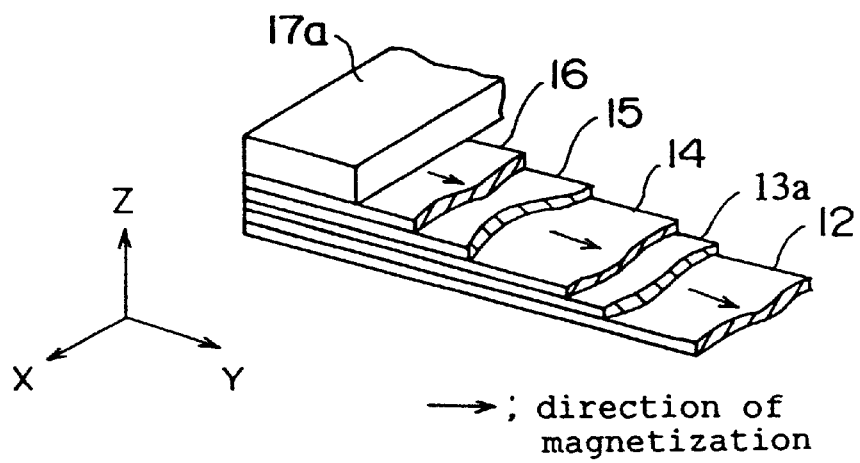
FIG. 4B is a perspective view showing part of a laminated structure of the magnetoresistive head in FIG. 4A.
Figure 4C:
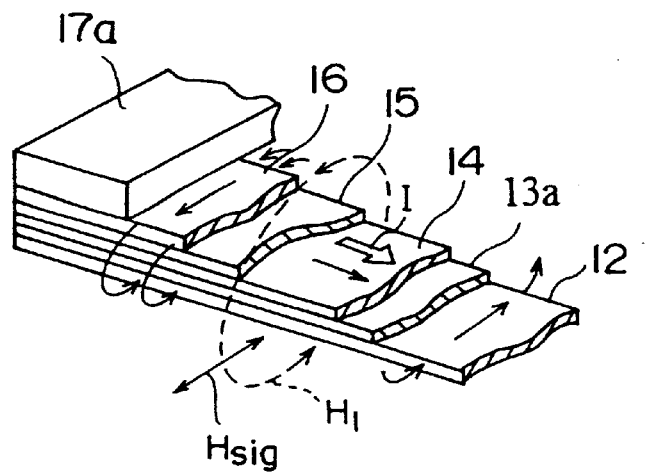
FIG. 4C is a perspective view showing a relation between electric current and a magnetic field in case a sense current is supplied to the magnetoresistive head in FIG. 4A.

FIG. 4A is a sectional view showing a magnetoresistive head according to the second embodiment. FIG. 4B is a perspective view showing the magnetoresistive head in FIG. 4A. The same parts as in FIGS. 3A and 3B are denoted by the same reference symbols as used therein.

In FIGS. 4A and 4B, a first magnetic layer 12 having a film thickness of 5 to 10 nm, a first nonmagnetic metal layer 13a having a film thickness of 2 to 4 nm, a second magnetic layer 14 having a film thickness of 3 to 10 nm, a second nonmagnetic metal layer 15 having a film thickness of 2 to 4 nm, and a third magnetic layer 16 having a film thickness of 3 to 10 nm are formed in that order on a substrate 11 having large electric resistance. The first nonmagnetic metal layer 13a and the second nonmagnetic metal layer 15 are formed respectively with a material having small electric resistance, for example, Au, Cu or the like. In addition, the first magnetic layer 12 and the third magnetic layer 16 are designed such that their products of saturation magnetization and film thicknesses have the same values or the close values (within about 10%) to each other.

Like the first embodiment, respective layers from the first magnetic layer 12 to the third magnetic layer 16 are formed to have a rectangular plane shape, a long side (y axis direction) of which is set in the direction of magnetization.

In addition, on the third magnetic layer 16, first and second lead electrodes 17a and 17b are formed by the same conditions as in the first embodiment so as to put a sense area A therebetween.

In the magnetoresistive head so constructed as described above, under the condition wherein the sense current I is supplied to the sense area A, all the first magnetic layer 12, the second magnetic layer 14 and the third magnetic layer 16 are magnetized in the longitudinal direction, as in the first embodiment. Further, when a signal magnetic field $H_{sig}$ is read from a magnetic medium, the sense current I is supplied to the sense area A formed between the first and second lead electrodes 17a and 17b by connecting the electrodes 17a and 17b to a constant current source. The sense current I is flown in the direction either identical to the direction of magnetization of the second magnetic layer 14 or opposite thereto.

Since a magnetic field $H_1$ is generated by the sense current I therearound in the direction perpendicular to the direction of magnetization of the second magnetic layer 14, the first magnetic layer 12 and the third magnetic layer 16 are magnetized by the magnetic field $H_1$ in the direction intersected orthogonally with the direction of magnetization of the second magnetic layer 14.

Consequently, like the first embodiment, the first magnetic layer 12 and the third magnetic layer 16 are mutually coupled magnetostatically by the magnetic field $H_1$ which is generated by the sense current I. Thus, a leakage magnetic field leaked out from the first magnetic layer 12 and a leakage magnetic field leaked out from the third magnetic layer 16 are coupled, and therefore they cannot enter into the second magnetic layer 14 formed between the first magnetic layer 12 and the third magnetic layer 16.

Under the condition wherein there exists no signal magnetic field $H_{sig}$ generated by a magnetic recording medium, magnetization of the first magnetic layer 12 and the third magnetic layer 16 is orthogonally intersected with magnetization of the second magnetic layer 14. The direction of magnetization of the first magnetic layer 12 is opposite to that of the third magnetic layer 16.

With the above, also in the second embodiment, the specific resistance can be changed in response to the signal magnetic field without distortion.

In the meanwhile, in the second embodiment unlike the first embodiment, not only the second nonmagnetic metal layer 15 but also the first nonmagnetic metal layer 13a is formed with a material which has smaller specific resistance than those of the second magnetic layer 14 and the third magnetic layer 16. Therefore, the sense current I flowing between the first and second lead electrodes 17a and 17b also flows into the first magnetic layer 12. Consequently, since, unlike the first embodiment, the magnetoresistance effect can also be generated in the first magnetic layer 12, a rate of resistance change becomes large, so that voltage converted when reproducing the signal magnetic field can be increased. Thereby, read output can be increased to enhance sensitivity of the magnetoresistive head. Further, since respective products of saturation magnetization and the film thickness of the first magnetic layer 12 and the third magnetic layer 16 have the same values or the very close values to each other, magnetostatical coupling between them becomes stable.

As has been explained above, according to the second embodiment, the first, second and third magnetic layers are laminated through the nonmagnetic metal layers for isolating magnetically these magnetic layers, and the sense current is supplied to at least the second and third magnetic layers and the nonmagnetic metal layer therebetween in the direction either identical to the direction of magnetization of the second magnetic layer 14 or opposite thereto. Therefore, the first and third magnetic layers are magnetized by the magnetic field generated by the same current to be coupled magnetostatically to each other. The leakage magnetic fields leaked out from side portions of the first and third magnetic layers are prevented from being supplied to the second magnetic layer by mutually coupling them.

As a result, magnetization of the second magnetic layer cannot be inclined by the leakage magnetic fields, but can be rotated by the signal magnetic field generated from the magnetic recording medium. Thus, the specific resistance can be changed linearly in response to the change in the signal magnetic field, and it can be prevented that distortion in the voltage waveform is generated at the time of reproducing.

If the sense current is supplied to all layers from the first magnetic layer to the third magnetic layer by forming the specific resistance of the first nonmagnetic metal layer to the second nonmagnetic metal layer, the spin valve magnetoresistance effect is caused in the first, second and third magnetic layers. Thus, resistance change can be increased, and therefore the reproducing sensitivity can be improved.

In this case, if respective products of saturation magnetization and the film thickness of the first magnetic layer and the third magnetic layer are set to have the same values or the very close values to each other, magnetostatical coupling between them can be stabilized.

Third Embodiment

Figure 5A:
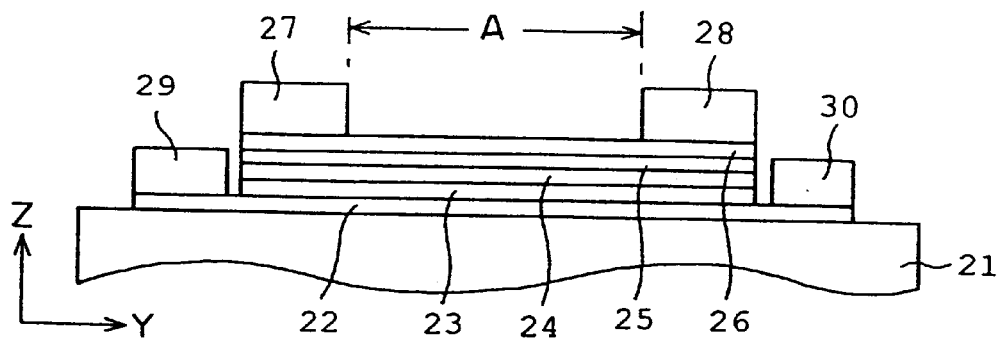
FIG. 5A is a side view showing a spin valve magnetoresistive head according to a third embodiment of the present invention.
Figure 5B:
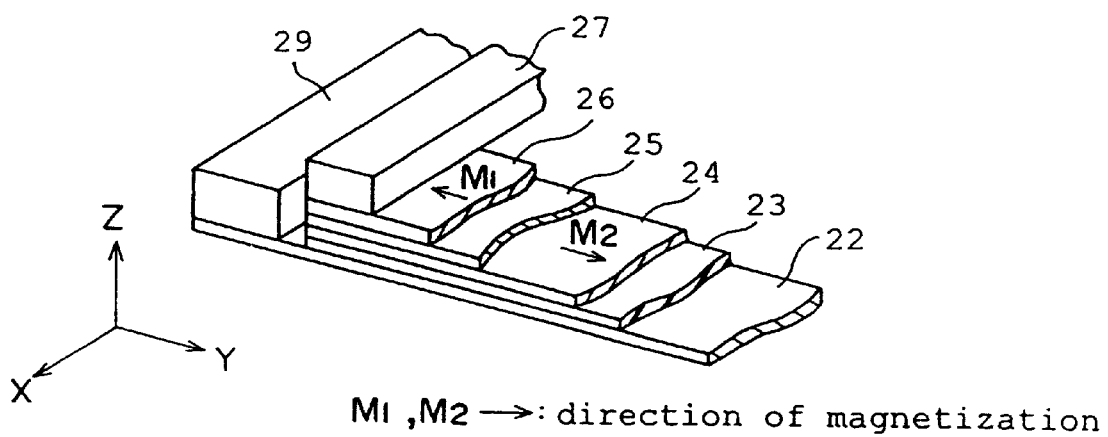
FIG. 5B is a perspective view showing part of the spin valve magnetoresistive head in FIG. 5A.
Figure 5C:
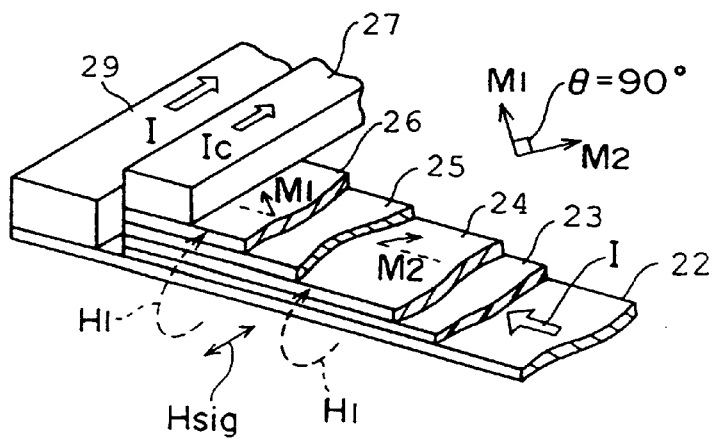
FIG. 5C is a perspective view showing a state wherein the direction of magnetization is changed.

FIG. 5A is a sectional view showing a magnetoresistive head according to a third embodiment of the present invention. FIG. 5B is a perspective view showing the magnetoresistive head in FIG. 5A. FIG. 5C is a perspective view showing a state wherein the direction of magnetization is changed.

As shown in FIGS. 5A to 5C, a first nonmagnetic metal layer 22 having a film thickness of 5 to 10 nm, an insulating layer 23 having a film thickness of 5 to 50 nm, a first soft magnetic layer 24 having a film thickness of 2 to 5 nm, a second nonmagnetic metal layer 25 having a film thickness of 2 to 5 nm, and a second soft magnetic layer 26 having a film thickness of 2 to 5 nm are formed on a substrate 21 having large electric resistance in that order by sputtering, evaporation etc. in the same vacuum chamber. The first nonmagnetic metal layer 22 is used as a magnetization direction adjusting layer for the first soft magnetic layer 24 and the second soft magnetic layer 26.

The first soft magnetic layer 24 is magnetized in a first direction (Y-axis direction) in parallel to the face of the substrate 21 when it is grown. In addition, the second soft magnetic layer 26 is magnetized in a second direction opposite to the first direction when it is grown. These magnetization $M_1$, $M_2$ are formed by applying the external magnetic field to the layers 24, 26. The first and second directions are easy magnetization axes (This is the same as in fourth and fifth embodiments.)

Respective layers formed on the substrate 21 are patterned by ion milling using a resist mask (not shown) to have a rectangular plane shape. As shown in FIG. 5B, in the rectangular plane shape, directions of magnetization $M_1$, $M_2$ of the first soft magnetic layer 24 and the second soft magnetic layer 26 are set to the longitudinal direction, and a long side (Y-axis direction) is 10 to 100 μm and a short side (X-axis direction) is 1 to 5 μm, for example. The first nonmagnetic metal layer 22 is formed to extrude from both ends of the longitudinal direction in contrast to other layers. The direction of the short side is also referred to as the width direction hereinbelow. The z axis direction is set to the direction of the film thickness.

The first nonmagnetic metal layer 22 and the second nonmagnetic metal layer 25 are formed with a metal such as copper (Cu) or gold (Au) which has small specific resistance.

The first soft magnetic layer 24 and the second soft magnetic layer 26 are formed with a soft magnetic material which is made of, for example, either one of an iron-nickel (NiFe) film; the NiFe film into which an element such as chromium (Cr), niobium (Nb), molybdenum (Mo) or vanadium (V) is added; a simple substance film of cobalt (Co) or nickel (Ni) or an alloy film including cobalt (Co) or nickel (Ni); an iron (Fe) film; and a Co system amorphous film.

In order to isolate electrically the first non-magnetic metal layer 22 from the layers formed thereabove, the isolating layer 23 is formed with, for instance, alumina ($Al_2O_3$) which is an inorganic isolating material.

In addition, first and second electrodes 29, 30 are formed by a lift-off method at both ends of the first nonmagnetic metal layer 22, while being isolated from the first soft magnetic layer 24 and the second soft magnetic layer 26 and the second nonmagnetic metal layer 25. Third and fourth electrodes 27, 28 are formed by a lift-off method at both ends of the second soft magnetic metal layer 26, while being isolated from the first and second electrodes 29, 30. The first to fourth electrodes 27 to 30 are formed with an Au film having a thickness of 100 to 200 nm. A sense area A is formed between the third and fourth electrodes 27, 28.

In the spin valve magnetoresistive head formed as above, as shown in FIG. 5C, when electric current I is supplied to the first nonmagnetic metal layer 22 formed between the first and second electrodes 29, 30 via the electrodes 29, 30, a magnetic field $H_1$ is generated around the first nonmagnetic metal layer 22. For this reason, the magnetization of the first soft magnetic layer 24 and the second soft magnetic layer 26 are rotated in reverse directions. As a result, an angle θ between both directions of magnetization is decreased. By adjusting a magnitude of the electric current I, the directions of magnetization are set to be intersected orthogonally (θ=90 degrees or 270 degrees) with each other under the condition when the external signal magnetic field $H_{sig}$ is zero.

After adjusting the magnitude of the electric current I flowing in the first nonmagnetic metal layer 22, constant electric current $I_c$ is supplied to the first soft magnetic layer 24, the second nonmagnetic metal layer 25 and the second soft magnetic layer 26 via the third and fourth electrodes 27, 28. In addition, when the signal magnetic field $H_{sig}$ is applied in the width direction, magnetization $M_1$, $M_2$ of the first soft magnetic layer 24 and the second soft magnetic layer 26 are rotated according to the magnitude or the direction of the signal magnetic field $H_{sig}$. As a result, the angle θ between them is varied. Based on the angle θ, scattering state of conduction electrons in the first soft magnetic layer 24, the second nonmagnetic metal layer 25 and the second soft magnetic layer 26 is varied to change the electric resistance. The change of the electric resistance is converted into voltage and is then reproduced.

As described above, since, in the spin valve magnetoresistive head of the third embodiment, the directions of magnetization $M_1$, $M_2$ of the first soft magnetic layer 24 and the second soft magnetic layer 26 are adjusted by the magnetic field generated by the electric current flowing in the first nonmagnetic metal layer 22, the directions of magnetization $M_1$, $M_2$ can be precisely intersected orthogonally with each other. Therefore, the electric resistance can be varied linearly. Besides, since both the magnetization of the first soft magnetic layer 24 and the second soft magnetic layer 26 can be rotated by the external signal magnetic field $H_{sig}$, a change rate of the electric resistance by a unit signal magnetic field can be increased in contrast to the case where only one of the layers 24 and 26 is rotated by the external signal magnetic field $H_{sig}$. As a result, sensitivity can be enhanced when used as the magnetic information read device.

Further, only the first nonmagnetic metal layer 22 is formed on a rear face of the first soft magnetic layer 24 via the insulating layer 23. Therefore, the size of the device is never enlarged, and the request for the miniaturization of the device can be satisfied.

It is preferable that both the direction of the current for adjusting the direction of magnetization of the first soft magnetic layer 24 and the second soft magnetic layer 26 and the direction of the constant current $I_c$ for attaining the spin valve magnetoresistance effect are set in the same direction. In other words, if the directions of the current I, $I_c$ are opposite to each other, magnetic fields caused by the current I, $I_c$ are negated mutually. Thus, the current I for adjusting the directions of magnetization $M_1$, $M_2$ of the first soft magnetic layer 24 and the second soft magnetic layer 26 has to be increased to result in increased heat generation and external devices are affected badly.

Fourth Embodiment

In a fourth embodiment, the directions of magnetization of a first soft magnetic layer and a second soft magnetic layer separated magnetically are adjusted by a hard magnetic layer.

Figure 6A:
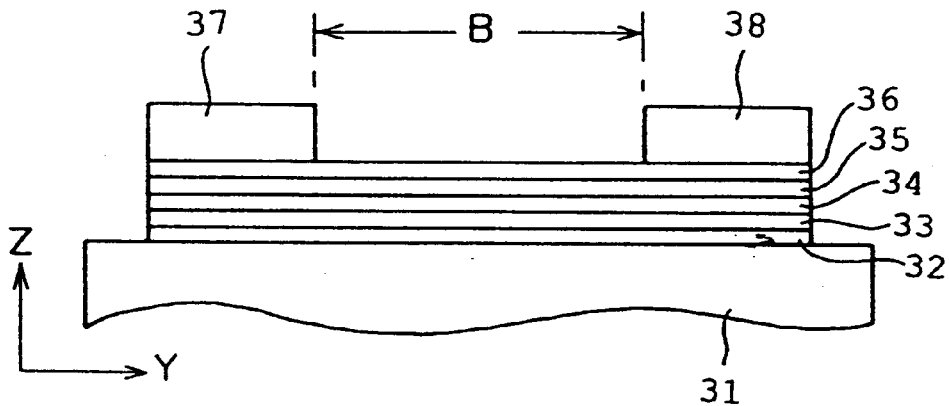
FIG. 6A is a side view showing a spin valve magnetoresistive head according to a fourth embodiment of the present invention.
Figure 6B:
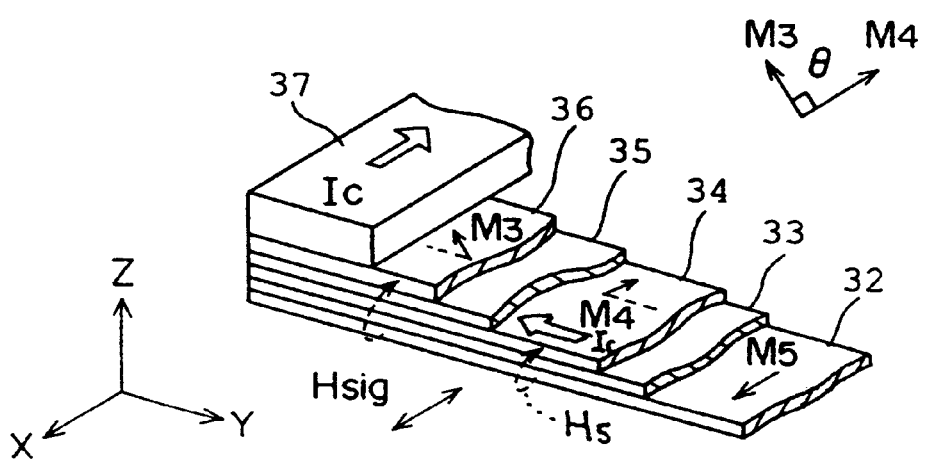
FIG. 6B is a perspective view showing part of the spin valve magnetoresistive head in FIG. 6A.

FIG. 6A is a sectional view showing a magnetoresistive head according to the fourth embodiment. FIG. 6B is a perspective view showing the magnetoresistive head in FIG. 6A.

In FIGS. 6A and 6B, a hard magnetic layer 32 having a film thickness of 5 to 10 nm, a magnetic separating layer 33 having a film thickness of 5 to 50 nm, a first soft magnetic layer 34 having a film thickness of 2 to 5 nm, a nonmagnetic metal layer 35 having a film thickness of 2 to 5 nm, and a second soft magnetic layer 36 having a film thickness of 2 to 5 nm are grown in that order on a substrate 31 having large electric resistance in the same vacuum chamber by sputtering, evaporation or the like. The hard magnetic layer 32 is used as a magnetization direction adjusting layer for the first soft magnetic layer 34 and the second soft magnetic layer 36.

The first soft magnetic layer 34 is magnetized in a first direction (Y-axis direction) in parallel to the face of the substrate 31 when it is grown. In addition, the second soft magnetic layer 36 is magnetized in a second direction opposite to the first direction when it is grown. The hard magnetic layer 32 is magnetized in the direction (X-axis direction) intersected orthogonally with both the first direction and the second direction.

The hard magnetic layer 32 is formed with, for example, CoCrPt, samarium-cobalt alloy, iron-neogium-boron alloy, barium ferrite. The magnetic separating layer 33 is formed with a nonmagnetic layer such as tantalum (Ta) and titanium (Ti) or an insulating layer such as $Al_2O_3$.

The first and second soft magnetic layers 34, 36 and the nonmagnetic metal layer 35 are formed respectively with the material having the same function as shown in the first embodiment.

Respective layers formed on the substrate 31 are patterned by ion milling using a resist mask (not shown) to have a rectangular plane shape. As shown in FIG. 6B, in the rectangular plane shape, directions of magnetization of the first soft magnetic layer 34 and the second soft magnetic layer 36 are set to the longitudinal direction, and a long side (Y axis direction) is 10 to 100 μm and a short side (X-axis direction) is 1 to 5 μm, for example. The direction of the short side is also referred to as the width direction hereinbelow. The Z-axis direction is set to the direction of the film thickness.

First and second electrodes 37, 38 made of Au having a film thickness of 100 to 200 nm are formed by a lift-off method on both sides of the sense area B of the second soft magnetic layer 36.

In the meanwhile, as shown in FIG. 6B, the direction of magnetization $M_5$ of the hard magnetic layer 32 is intersected orthogonally with the directions of magnetization $M_3$, $M_4$ of the first soft magnetic layer 34 and the second soft magnetic layer 36 and is not coupled to the first soft magnetic layer 34 and the second soft magnetic layer 36 by exchange coupling. However, the directions of magnetization $M_3$, $M_4$ of the first soft magnetic layer 34 and the second soft magnetic layer 36 are rotated by the leakage magnetic field $H_5$ leaked from the hard magnetic layer 32. In this case, in order to change the resistance linearly by the signal magnetic field, magnetization $M_3$, $M_4$ of the first soft magnetic layer 34 and the second soft magnetic layer 36 must be intersected orthogonally with each other in a state of no signal magnetic field $H_{sig}$. A magnitude of magnetization $M_5$ of the hard magnetic layer 32 is in advance adjusted to provide a magnetic field which makes the directions of magnetization $M_3$, $M_4$ intersect with each other.

This can be achieved if a sum of a product of an X-axis component of the magnetization $M_3$ of the first soft magnetic layer 34 and its film thickness and a product of an X-axis component of the magnetization $M_4$ of the second soft magnetic layer 36 and its film thickness is made to be equal to a product of the magnetization $M_5$ of the hard magnetic layer 32 and its film thickness.

In a state wherein constant electric current $I_c$ is supplied to the first soft magnetic layer 34 and the second soft magnetic layer 36 in the sense area B and the signal magnetic field $H_{sig}$ is applied, if an angle between the directions of magnetization $M_3$, $M_4$ of the first soft magnetic layer 34 and the second soft magnetic layer 36 is smaller than 90 degrees, scattering of conduction electrons is small and the electric resistance of the magnetoresistive head is decreased. On the contrary, if the angle is larger than 90 degrees, scattering of conduction electrons is large and the electric resistance of the magnetoresistive head is increased.

As described above, since the directions of magnetization $M_3$, $M_4$ of the first soft magnetic layer 34 and the second soft magnetic layer 36 are adjusted by the leakage magnetic field generated by the hard magnetic layer 32, the directions of magnetization $M_3$, $M_4$ can be precisely intersected orthogonally with each other. Therefore, the electric resistance can be varied linearly. Besides, since both the magnetization of the first soft magnetic layer 34 and the second soft magnetic layer 36 can rotate by the signal magnetic field $H_{sig}$, sensitivity can be enhanced like the third embodiment when used as the magnetic information read device.

Further, only the hard magnetic layer 32 is formed on rear faces of the first and second soft magnetic layers 34, 36 via the magnetic separating layer 33. Therefore, the size of the device is never enlarged, and the request for the miniaturization of the device can be satisfied.

In addition, since the fourth embodiment does not include the configuration for flowing the current, as in the third embodiment, in order to incline the magnetization $M_3$, $M_4$ of the first soft magnetic layer 34 and the second soft magnetic layer 36, the configuration can be simplified.

Fifth Embodiment

In a fifth embodiment, the directions of magnetization of a first soft magnetic layer and a second soft magnetic layer separated magnetically are adjusted by a soft magnetic layer.

Figure 7A:
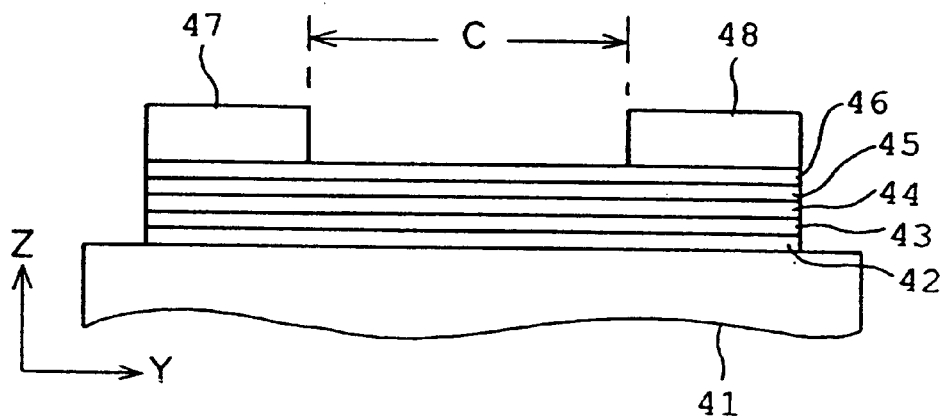
FIG. 7A is a side view showing a spin valve magnetoresistive head according to a fifth embodiment of the present invention.
Figure 7B:
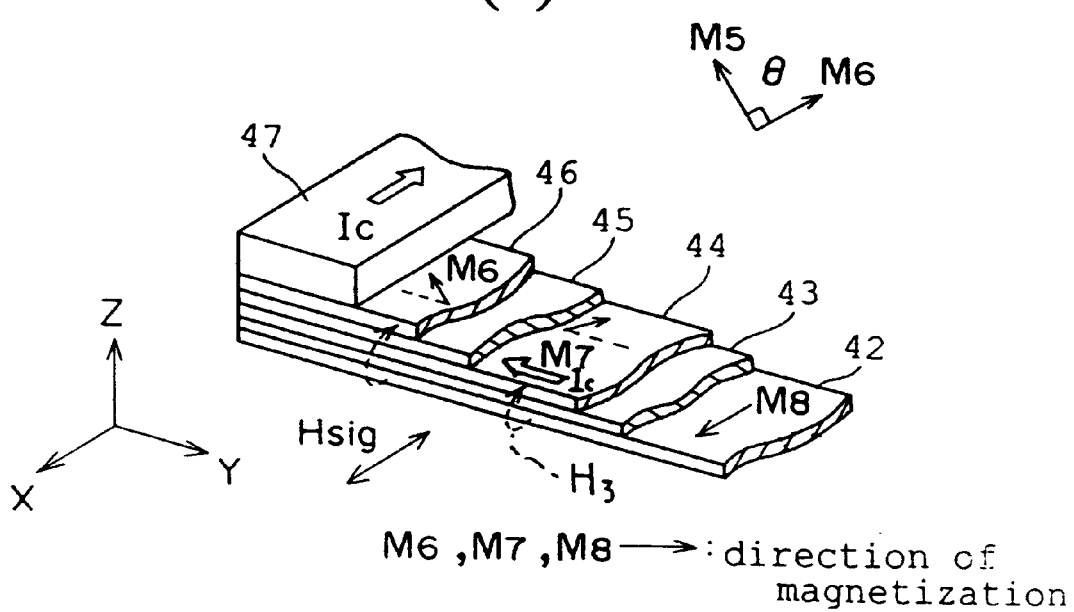
FIG. 7B is a perspective view showing part of the spin valve magnetoresistive head in FIG. 7A.

FIG. 7A is a sectional view showing a magnetoresistive head according to the fifth embodiment. FIG. 7B is a perspective view showing the magnetoresistive head in FIG. 7A.

In FIGS. 7A and 7B, a third hard magnetic layer 42 having a film thickness of 5 to 10 nm, a magnetic separating layer 43 having a film thickness of 5 to 50 nm, a first soft magnetic 44 having a film thickness of 2 to 5 nm, a nonmagnetic metal layer 45 having a film thickness of 2 to 5 nm, and a second soft magnetic layer 46 having a film thickness of 2 to 5 nm are grown in that order on a substrate 41 having large electric resistance in the same vacuum chamber by sputtering, evaporation or the like. The third hard magnetic layer 42 is used as a magnetization direction adjusting layer for the first soft magnetic layer 44 and the second soft magnetic layer 46.

The first soft magnetic layer 44 is magnetized in a first direction (Y-axis direction) in parallel to the face of the substrate 41 when it is grown. In addition, the second soft magnetic layer 46 is magnetized in a second direction opposite to the first direction when it is grown.

Like the fourth embodiment, respective layers formed on the substrate 41 are patterned by ion milling using a resist mask (not shown) to have a rectangular plane shape.

The third soft magnetic layer 42 is formed with a soft magnetic material which is made of, for example, either one of an iron-nickel (NiFe) film; the NiFe film into which an element such as chromium (Cr), niobium (Nb), molybdenum (Mo) or vanadium (V) is added; a simple substance film of cobalt (Co) or nickel (Ni) or an alloy film including cobalt (Co) or nickel (Ni); an iron (Fe) film; and a Co system amorphous film.

The magnetic separating layer 43, the first soft magnetic 44, the nonmagnetic metal layer 45, and a second soft magnetic layer 46 are respectively formed with materials having the same function as those in the fourth embodiment.

First and second electrodes 47, 48 made of Au having a film thickness of 100 to 200 nm are formed by a lift-off method on both sides of the sense area C of the second soft magnetic layer 46.

In the meanwhile, as shown in FIG. 7B, constant electric current $I_c$ is supplied to the first soft magnetic layer 44 and the second soft magnetic layer 46 in the sense area C and the nonmagnetic metal layer 45 is via the first and second electrodes 47, 48. The magnetic field $H_3$ is generated by the constant electric current $I_c$ and saturation magnetization $M_8$ is formed in the hard magnetic layer 42 by the magnetic field $H_3$. The saturation magnetization $M_8$ of the hard magnetic layer 42 is intersected orthogonally with the directions of magnetization $M_6$, $M_7$ of the first soft magnetic layer 44 and the second soft magnetic layer 46.

The directions of magnetization $M_6$, $M_7$ of the first soft magnetic layer 44 and the second soft magnetic layer 46 are rotated by the leakage magnetic field $H_3$ caused by the saturation magnetization $M_8$ in the hard magnetic layer 42 to intersect both directions of magnetization $M_6$, $M_7$ orthogonally with each other. This can be achieved if a sum of a product of an X-axis component of the magnetization $M_6$ of the first soft magnetic layer 44 and its film thickness and a product of an X-axis component of the magnetization $M_7$ of the second soft magnetic layer 46 and its film thickness is made to be equal to a product of the magnetization $M_8$ of the third soft magnetic layer 42 and its film thickness.

Thereby, as in the fourth embodiment, a magnetic reading characteristic of the magnetoresistive head of the fifth embodiment is improved to operate linearly.

In the fifth embodiment, since the magnetization direction adjusting layers need not be magnetized like the fourth embodiment, there is an advantage such that manufacturing labor can be saved upon fabricating.

As described above, according to the third to fifth embodiments, the first soft magnetic layer and the second soft magnetic layer, both being magnetized in opposite directions to each other, are laminated via the nonmagnetic layer, and the magnetization direction adjusting layers which generate magnetization intersecting orthogonally with the easy magnetization axis of the first soft magnetic layer and the second soft magnetic layer are formed so that the magnetic fields generated by the first soft magnetic layer and the second soft magnetic layer are rotated to intersect orthogonally with each other. Thus, the specific resistance can be changed linearly with respect to the signal magnetic field.

In addition, since only the magnetization direction adjusting layers can be formed on the first soft magnetic layer, it can be prevented that the size of the magnetoresistive head becomes large.

Sixth Embodiment

Figure 8A:
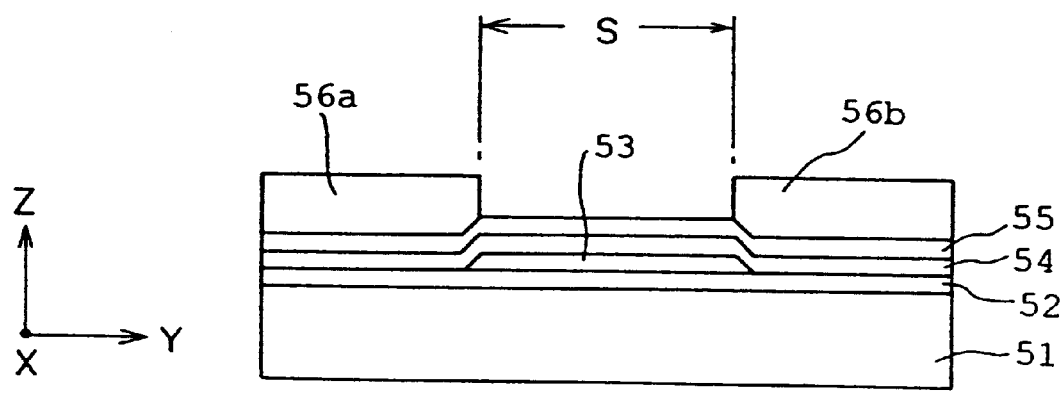
FIG. 8A is a sectional view showing a spin valve magnetoresistive head according to a sixth embodiment of the present invention.

A spin valve magnetoresistive head according to a sixth embodiment will be explained hereinafter. FIG. 8A is a sectional view showing the spin valve magnetoresistive head according to the sixth embodiment.

In FIG. 8A, a reference 51 denotes a substrate made with alumina ($Al_2O_3$), a reference 52 denotes a first soft magnetic layer made with NiFe. The first soft magnetic layer 52 is formed by sputtering, evaporation etc. on the substrate 51 to have a film thickness of about 20 to 50 Å.

A reference 53 denotes a nonmagnetic metal layer made with Cu or Au formed on the first soft magnetic layer 52 by sputtering, evaporation etc. to have a film thickness of about 20 to 50 Å. Under the condition where a sense area S is covered by a photoresist (not shown), the non-magnetic metal layer 53 is patterned by ion milling method so as to leave a width of about 20 μm (Y-axis direction in FIG. 8A) between two lead electrodes 56a, 56b which are formed by later process.

Reference number 54 denotes a second soft magnetic layer made of NiFe film which is formed on the first soft magnetic layer 52 and the nonmagnetic metal layer 53. The second soft magnetic layer 54 is formed by sputtering, evaporation etc. to have a film thickness of about 20 to 50 Å.

Reference 55 denotes an antiferromagnetic layer made of FeMn film which is formed on the second soft magnetic layer 54. The antiferromagnetic layer 55 is formed by sputtering, evaporation etc. to have a film thickness of about 20 to 50 Å.

Magnetization of the second soft magnetic layer 54 is fixed in the X-axis direction in FIG. 8A by means of exchange coupling of the antiferromagnetic layer 55. And, in a no external magnetic field state, the first soft magnetic layer 52 is magnetized in the direction perpendicular to the direction of magnetization of the second soft magnetic layer 54 (Y-axis direction in FIG. 8A). The X-axis is intersected orthogonally with both the Z-axis (film thickness direction) and the Y-axis.

Respective layers from the first soft magnetic layer 52 to the antiferromagnetic layer 55 are patterned by ion milling to be left as a rectangular plane shape.

First and second lead electrodes 56a, 56b made of Au having a film thickness of about 100 to 200 nm are formed on the antiferromagnetic layer 55 in both areas of the nonmagnetic metal layer 53.

In case the signal magnetic field generated by the magnetic recording medium is converted into the electric signal by the spin valve magnetoresistive head described advance, the change of the electric resistance caused correspondingly to the change of the signal magnetic field can be converted into the voltage change if the constant current is flown between a pair of lead electrodes 56a, 56b. The voltage change can be output as the reproducing electric signal.

According to the spin valve magnetoresistive head of the sixth embodiment, as shown in FIG. 8A, since the nonmagnetic metal layer 53 is formed only in the region between the lead electrodes 56a, 56b, the nonmagnetic metal layer 53 does not exist beneath the lead electrodes 56a, 56b so that the first soft magnetic layer 52 directly contacts to the second soft magnetic layer 54. Consequently, the magnetization of the first soft magnetic layer 52 right below the lead electrodes 56a, 56b can be fixed by the antiferromagnetic layer 55 in the same direction (X-axis direction) as the magnetization of the second soft magnetic layer 54. Therefore, since the above spin valve magnetoresistance effect is not caused in this area, the sense area can be defined only by the region between the lead electrodes 56a, 56b.

Therefore, according to the above spin valve magnetoresistive head aforementioned, even if the signal magnetic field generated by the non-reading track adjacent to the reading track of the magnetic recording medium (not shown) enters into the area right below the lead electrodes 56a, 56b, the spin valve magnetoresistance effect is never caused in such area. Therefore, the noise can be prevented from entering into the reproducing electric signal.

Figure 8B:
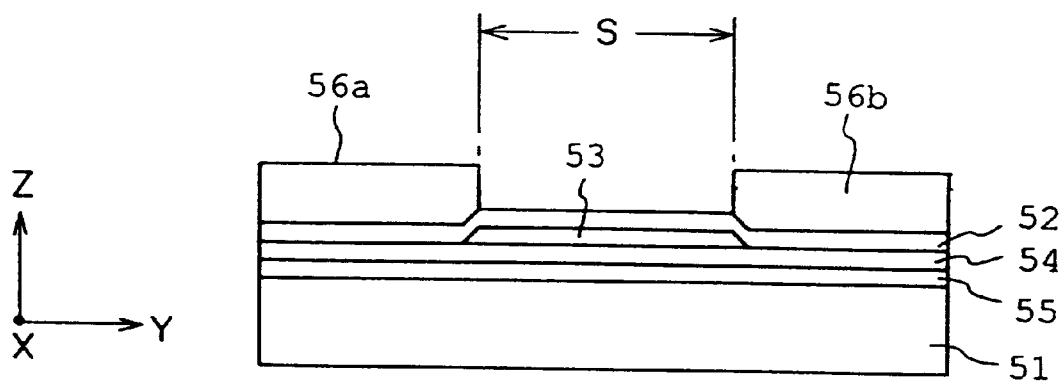
FIG. 8B is a sectional view showing the spin valve magnetoresistive head according to the sixth embodiment of the present invention.

As a modification of the spin valve magnetoresistive head according to a sixth embodiment, there will be a spin valve magnetoresistive head as shown in FIG. 8B. This modification has a reversely laminated structure in contrast to the structure shown in FIG. 8A.

In FIG. 8B, an antiferromagnetic layer 55 made of NiO film having a film thickness of about 20 to 50 Å, and a second soft magnetic layer 54 made of NiFe film having a film thickness of about 20 to 50 Å are formed in that order on a substrate 51 made with alumina ($Al_2O_3$). A nonmagnetic metal layer 53 made with Cu or Au formed on the second soft magnetic layer 54 in the sense area S. In addition, a first soft magnetic layer 52 is formed on the nonmagnetic metal layer 53 and the second soft magnetic layer 54 to have a film thickness of about 20 to 50 Å. A first and second lead electrodes 56a, 56b made of Au are formed on both sides of the sense area S and on the first soft magnetic layer 52.

Also, in the spin valve magnetoresistive head shown in FIG. 8B, since magnetization of the first soft magnetic layer 52 located beneath the lead electrodes 56a, 56b is fixed by the antiferromagnetic layer 55 in the X-axis direction identical to the second soft magnetic layer 54, the spin valve magnetoresistance is not caused. That is, the sense area S can be defined by areas on which the nonmagnetic metal layer 53 is formed. As a result, noise caused by external magnetization generated around the sense area S can be reduced.

The width of the nonmagnetic metal layer 53 in the Y-axis direction and the distance between the two lead electrodes 56a, 56b do not always coincide with each other. The distance between the two lead electrodes 56a, 56b may be set larger than the sense area S. However, the laminated structure formed of the first and second soft magnetic layers 52, 54 and the antiferromagnetic layer 55 in the area having no nonmagnetic metal layer 53 increases the electric resistance, and there is a possibility that heat is generated when the current is passed into the laminated structure. Therefore, it is preferable that the width of the nonmagnetic metal layer 53 in the Y-axis direction and the distance between the two lead electrodes 56a, 56b are set to be equal to each other.

In addition, in the spin valve magnetoresistive head shown in FIG. 8B, although NiO has been used as the material of the antiferromagnetic layer 55, CoMn or NiMn may attain the same advantages.

Seventh Embodiment

A spin valve magnetoresistive head according to a seventh embodiment will be explained hereinafter. FIGS. 9A and 9B and FIGS. 10A and 10B are sectional views showing the spin valve magnetoresistive head according to the sixth embodiment of the present invention.

Figure 9A:
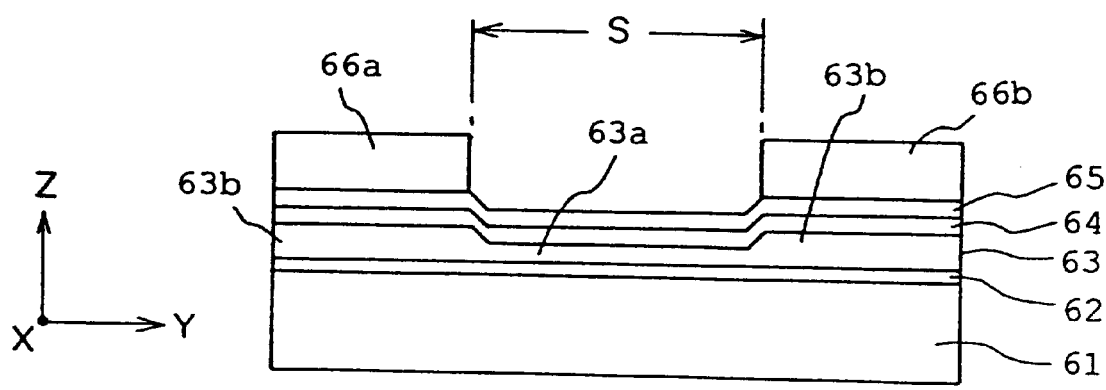
FIG. 9A is a sectional view showing a spin valve magnetoresistive head according to a seventh embodiment of the present invention.

In FIG. 9A, a first soft magnetic layer 62 made with NiFe is formed on a substrate 61 made with alumina ($Al_2O_3$). The first soft magnetic layer 62 is formed by sputtering, evaporation etc. on the substrate 51 to have a film thickness of about 20 to 50 Å.

A nonmagnetic metal layer 63 made with Cu is formed on the first soft magnetic layer 62 by sputtering, evaporation etc. to have a film thickness of about 20 to 50 Å. The nonmagnetic metal layer 63 is formed thickly on both sides of the sense area S to have a film thickness of about 20 to 50 nm and formed thinly in the sense area S to have a film thickness of about 10 to 50 Å.

When forming the nonmagnetic metal layer 63, first a Cu film 63a is formed on entire surface of the first soft magnetic layer 62 by sputtering, evaporation etc. to have a film thickness of about 10 to 50 Å, and then a Cu film 63b is formed on both sides of the sense area S by a lift-off method to have a film thickness of about 20 to 50 nm.

A second soft magnetic layer 64 made of NiFe film and an antiferromagnetic layer 65 made of FeMn film are formed in that order on the nonmagnetic metal layer 63. A film thickness of these layers is about 20 to 50 Å.

Magnetization of the second soft magnetic layer 64 is fixed in the X-axis direction in FIG. 8A by means of exchange coupling of the antiferromagnetic layer 65. And, in a no external magnetic field state, the first soft magnetic layer 62 is magnetized in the direction perpendicular to the direction of magnetization of the second soft magnetic layer 64 (Y-axis direction in FIG. 8A). The X-axis is intersected orthogonally with both the Z-axis (film thickness direction) and the Y-axis.

Respective layers from the first soft magnetic layer 62 to the antiferromagnetic layer 65 are patterned by ion milling to be left as a rectangular plane shape.

A pair of lead electrodes 66a, 66b made of Au having a film thickness of about 100 to 200 nm are formed on the antiferromagnetic layer 65 and on both sides of the sense area S.

The spin valve magnetoresistive head of the seventh embodiment also converts the signal magnetic field generated by the magnetic recording medium into an electric signal in the same manner as in the sixth embodiment.

According to the seventh embodiment, as shown in FIG. 9A, the nonmagnetic metal layer 63 comprises a thin Cu film 63a having a film thickness of about 10 to 50 Å formed in the sense area between a pair of lead electrodes 66a, 66b, and a thick Cu film 63b having a film thickness of about 20 to 50 nm formed beneath a pair of lead electrodes 66a, 66b.

Therefore, since a film thickness of the nonmagnetic metal layer 63b on both sides of the sense area S is thick, the current passing between the lead electrodes 66a, 66b flows mainly in the thick nonmagnetic metal layer 63 in the area beneath the lead electrodes 66a, 66b. Thus, the spin valve magnetoresistance effect hardly occurs. In addition, since a distance between the first soft magnetic layer 62 and the second soft magnetic layer 64 is increased in the area beneath the lead electrodes 66a, 66b, an interaction action of magnetization between the first soft magnetic layer 62 and the second soft magnetic layer 64 seldom occurs. As a result, the spin valve magnetoresistance effect can be extremely reduced.

Thereby, the sense area S can be defined by the width of the nonmagnetic metal layer 63b between a pair of lead electrodes 66a, 66b with precision.

Figure 9B:
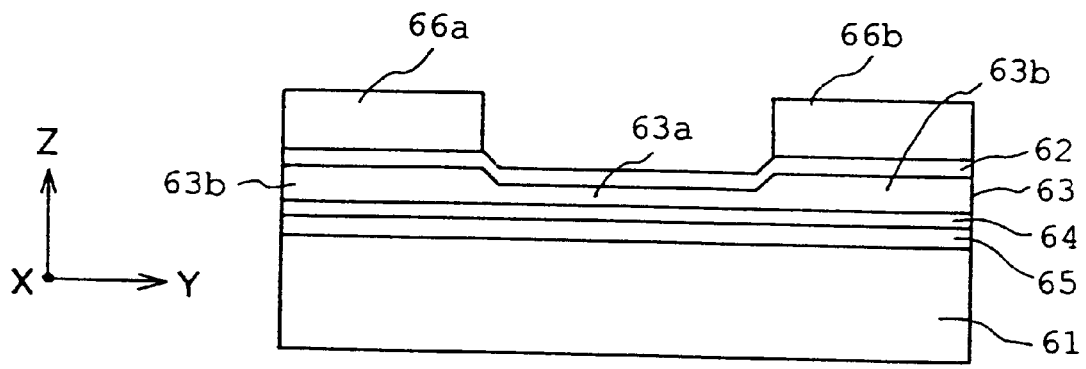
FIG. 9B is a sectional view showing the spin valve magnetoresistive head according to the seventh embodiment of the present invention.
Figure 10A:
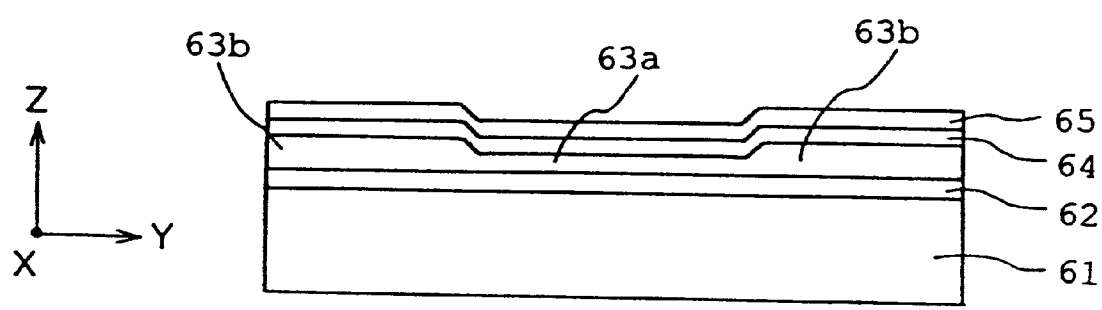
FIG. 10A is a sectional view showing the spin valve magnetoresistive head according to the seventh embodiment of the present invention.
Figure 10B:
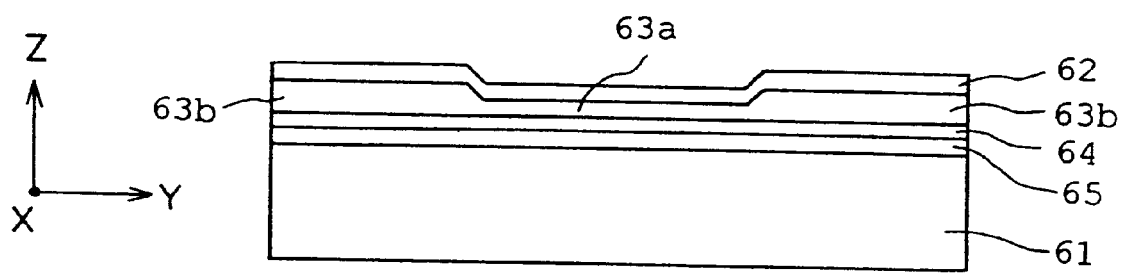
FIG. 10B is a sectional view showing the spin valve magnetoresistive head according to the seventh embodiment of the present invention.

As a modification of the spin valve magnetoresistive head according to a seventh embodiment, there will be a spin valve magnetoresistive head as shown in FIG. 9B. This modification has a reversely laminated structure in contrast to the structure shown in FIG. 8A.

In FIG. 9B, an antiferromagnetic layer 65 made of NiO film having a film thickness of about 20 to 50 Å, and a second soft magnetic layer 64 made of NiFe film having a film thickness of about 20 to 50 Å are formed in that order on a substrate 61 made with alumina. A nonmagnetic metal layer 63 is formed on the second soft magnetic layer 64. The nonmagnetic metal layer 63 comprises a Cu film 63a having a film thickness of about 10 to 50 Å formed in the sense area S, and a Cu film 63b having a film thickness of about 20 to 50 nm formed beneath a pair of lead electrodes 66a, 66b. In addition, a first soft magnetic layer 62 is formed on the nonmagnetic metal layer 63. A pair of lead electrodes 66a, 66b made of Au are formed on both sides of the sense area S.

Also, in this modification, like the spin valve magnetoresistive head shown in FIG. 9B, since it is difficult to cause the spin valve magnetoresistance effect in the area beneath the lead electrodes 66a, 66b, the sense area S can be defined by the width of the thin nonmagnetic metal layer 63 formed between the lead electrodes 66a, 66b with accuracy.

In the meanwhile, since the nonmagnetic metal layer 63 has a thick film thickness on both sides of the sense area S, such thick film thickness portions can be commonly used as the lead electrode. In other words, the structure shown in FIGS. 10A and 10B may be employed by eliminating the lead electrodes 66a, 66b from the structure shown in FIGS. 9A and 9B. In this case, the lead electrodes are connected to the rectangular shape areas of the first and second soft magnetic layers 62, 64 and the nonmagnetic metal layer 63.

Thereby, the spin valve magnetoresistive head can be obtained in a small size.

In addition, in the device shown in FIG. 9B, NiO has been used as the antiferromagnetic layer 65, but the present invention is not limited to such material. For example, CoMn or NiMn may attain the same advantage. In addition, as the material for the nonmagnetic metal layer 63, Au as well as Cu may be used.

Eighth Embodiment

Figure 11:
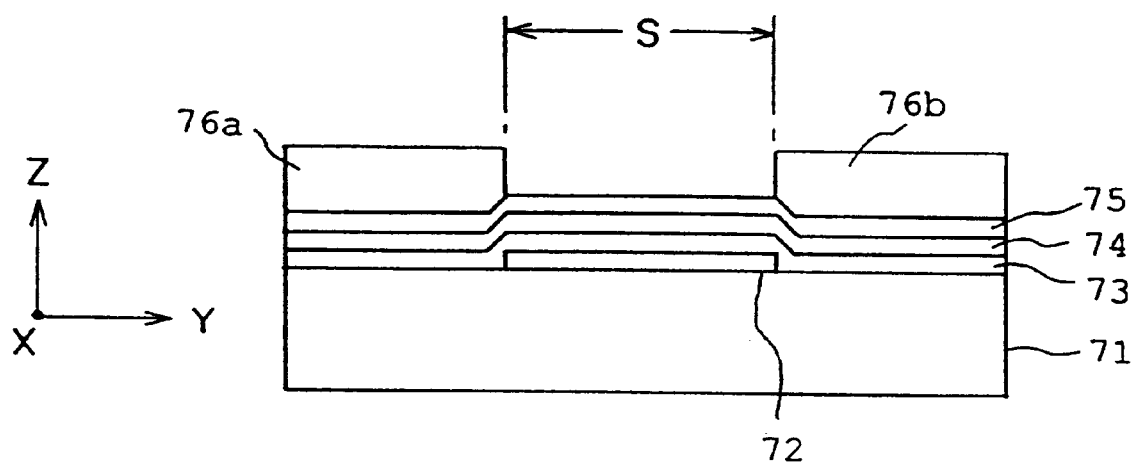
FIG. 11 is a sectional view showing a spin valve magnetoresistive head according to an eighth embodiment of the present invention.

A spin valve magnetoresistive head according to an eighth embodiment will be explained hereinafter. FIG. 11 is a sectional view showing the spin valve magnetoresistive head according to the eighth embodiment of the present invention.

In FIG. 11, a first soft magnetic layer 72 made with NiFe is formed in a sense area S and on a substrate 71 made with alumina to have a film thickness of about 20 to 50 Å. The first soft magnetic layer 72 is formed by sputtering, evaporation etc. on the substrate 71 and then is patterned by ion milling and photolithography using a resist mask. The first soft magnetic layer 72 has a width of 20 μm in the Y-axis direction in FIG. 11.

A nonmagnetic metal layer 73 made with Cu, a second soft magnetic layer 74 made of NiFe film and an antiferromagnetic layer 75 made of FeMn film, each having a film thickness of about 20 to 50 Å, are formed in that order on the first soft magnetic layer 72 and the substrate 71 by sputtering, evaporation etc.

Magnetization of the second soft magnetic layer 74 is fixed in the X-axis direction in FIG. 11 by means of exchange coupling of the antiferromagnetic layer 75. And, in a no external magnetic field state, the first soft magnetic layer 72 is magnetized in the direction perpendicular to the direction of magnetization of the second soft magnetic layer 74 (Y-axis direction in FIG. 11). The X-axis is intersected orthogonally with both the Z-axis (film thickness direction) and the Y-axis.

Respective layers from the first soft magnetic layer 72 to the antiferromagnetic layer 75 are patterned by ion milling to be left as a rectangular plane shape.

In addition, a pair of lead electrodes 76a, 76b made of Au are formed by a lift-off method on the antiferromagnetic layer 75 and on both sides of the sense area S.

The first soft magnetic layer 72 exists in the area between these lead electrodes 76a, 76b.

In case the signal magnetic field generated from the magnetic recording medium is converted into the electric signal by the above spin valve magnetoresistive head, the change of the electric resistance caused by the change of the signal magnetic field is changed into the change of the voltage while the constant current flows between a pair of lead electrodes 76a, 76b. The change of the voltage is output as the reproducing electric signal.

According to the eighth embodiment, as shown in FIG. 11, the first soft magnetic layer 72 is formed only in the area formed between these lead electrodes 76a, 76b.

In this spin valve magnetoresistive head, the signal magnetic field generated from the magnetic recording medium is converted into the electric signal in the same manner as in the sixth embodiment.

In this device, the spin valve magnetoresistance effect can be caused only in the area wherein the first soft magnetic layer 72 is formed. Therefore, the spin valve magnetoresistance effect is never caused in the area under the lead electrodes 76a, 76b. Thereby, the sense area S can be defined with precision by the first soft magnetic layer 72 between the lead electrodes 76a, 76b.

Consequently, the signal magnetic field on the non-read track adjacent to the read track becomes difficult to be input into the magnetoresistive head as noise.

In addition, in the spin valve magnetoresistive head shown in FIG. 11, Cu has been used as the nonmagnetic metal layer 73, but the present invention is not limited to such material. For example, any nonmagnetic metal layer such as Au may attain the same advantage. In addition, although FeMn has been used as the antiferromagnetic layer 75, the present invention is not limited to such material. For example, the antiferromagnetic material such as CoMn, NiMn or NiO may be used.

Ninth Embodiment

A spin valve magnetoresistive head according to a ninth embodiment will be explained hereinafter with reference to FIGS. 12A to 12D along its manufacturing steps.

Figure 12A:
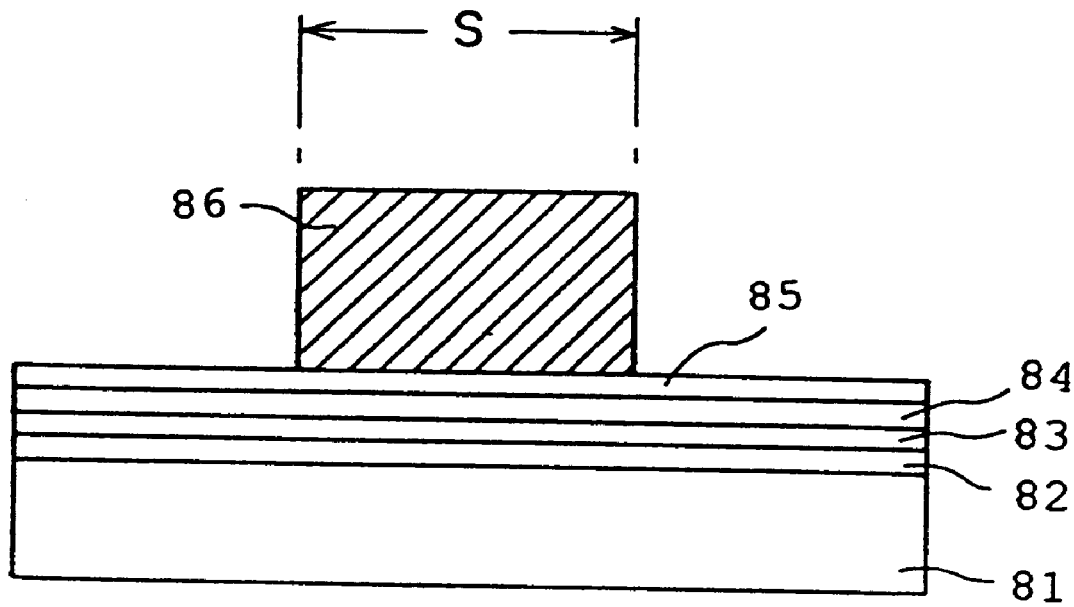
FIGS. 12A to 12D are sectional views each showing methods of manufacturing a spin valve magnetoresistive head according to a ninth embodiment of the present invention.

First, as shown in FIG. 12A, a antiferromagnetic layer 82 made with NiO, a second soft magnetic layer 83 made with NiFe, a nonmagnetic metal layer 84 made with Cu, and a first soft magnetic layer 85 formed with NiFe, each having a film thickness of 20 to 50 Å, are formed in that order on a substrate 81 made with alumina. Respective layers are patterned to be left as a rectangular plane shape including a sense area S, and then a resist film 86 is selectively formed on a surface of the first soft magnetic layer 85.

Figure 12B:
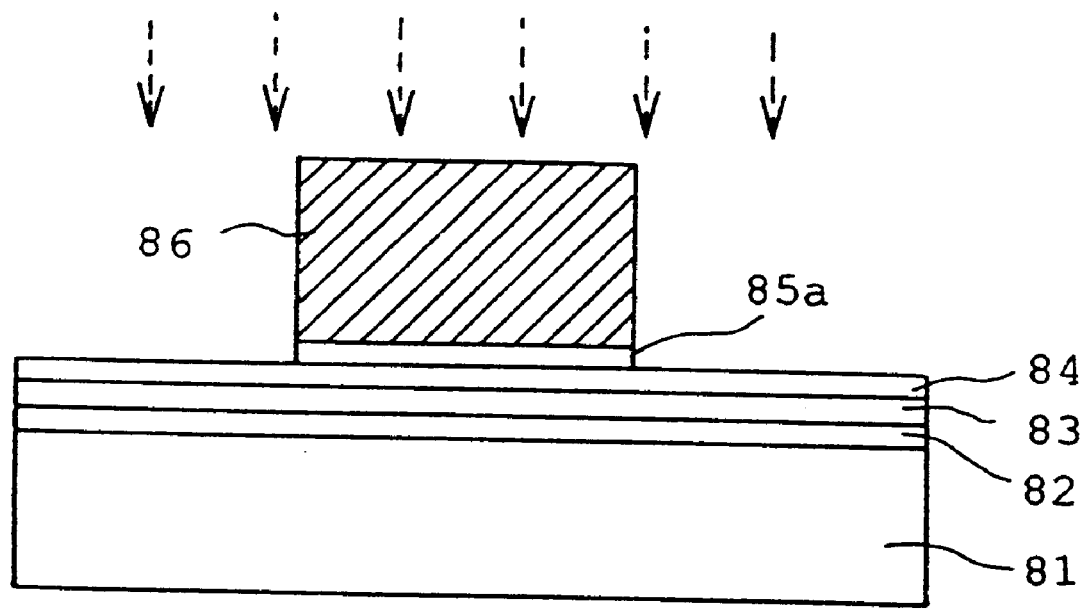

Then, as shown in FIG. 12B, the first soft magnetic layer 85 located in an area not covered by the resist film 86 is removed by ion milling using the resist film 86 as a mask, so that the first soft magnetic layer 85a is left only in the sense area S.

Figure 12C:
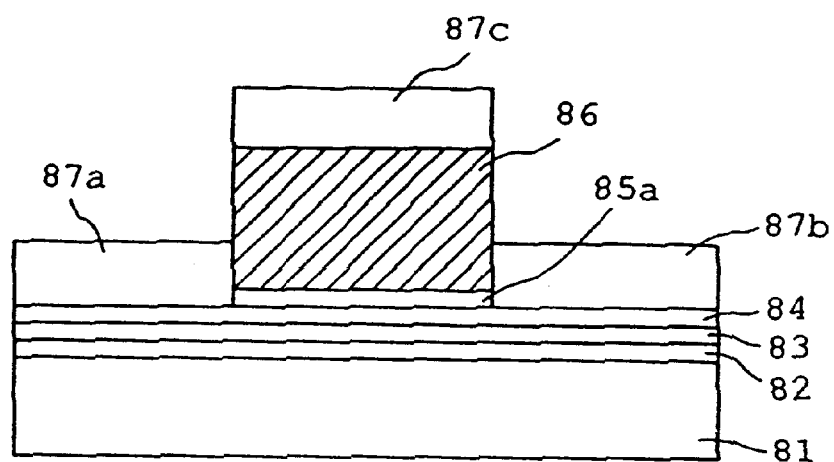

Subsequently, as shown in FIG. 12C, an Au film 87a to 87c are deposited on an entire surface by sputtering to have a film thickness of about 100 to 200 nm. Thereafter, as shown in FIG. 12D, a pair of lead electrodes 87a, 87b are formed adjacent to both sides of the first soft magnetic layer 85a by removing the resist film 86 by a solvent, thus completing the spin valve magnetoresistive head.

Figure 12D:
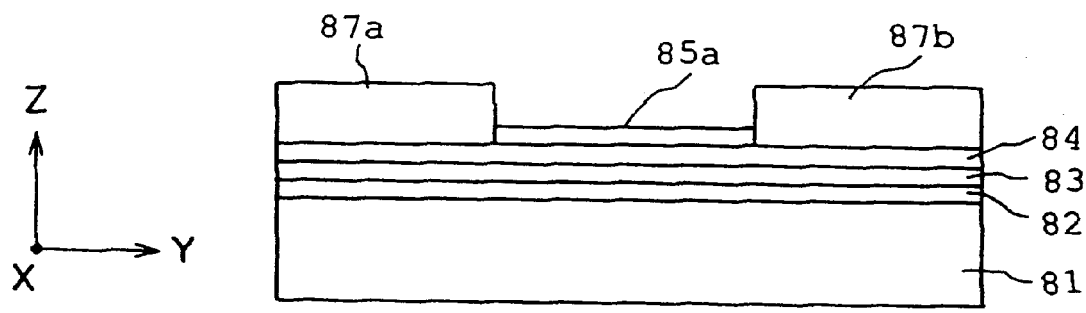

In the spin valve magnetoresistive head formed as above, as shown in FIG. 12D, the first soft magnetic layer 85a has been formed only in an area formed between a pair of lead electrodes 87a, 87b.

In the spin valve magnetoresistive head, the spin valve magnetoresistance effect can be caused only in the area wherein the laminated structure composed of the first and second soft magnetic layer 85a, 83 to put nonmagnetic metal layer 84 therebetween is formed. On the other hand, the spin valve magnetoresistance effect is not caused at all in the area just beneath the lead electrodes 87a, 87b wherein such laminated structure is not formed.

Thereby, like the eighth embodiment, since the sense area S can be defined with precision between the lead electrodes 87a, 87b, the sense area S is hardly affected by magnetic noise generated in the area except for the sense area S.

Further, according to the steps shown in FIG. 12, since, upon fabricating the spin valve magnetoresistive head of the ninth embodiment, the resist film 86 which is used as a mask for selectively forming the first soft magnetic layer 85a by ion milling is commonly employed as the lift-off mask for selectively forming the lead electrodes 87a, 87b, the fabricating steps can be simplified.

Furthermore, note that, although, in the device shown in FIG. 12D, Cu has been used as the material of the nonmagnetic metal layer 83, a nonmagnetic conductive metal material such as Au may be used. In addition, note that, although NiO has been used as the material of the antiferromagnetic layer 82, CoMn, NiMn or FeMn, for example, may be used.

As has been described above, according to the sixth embodiment, since the nonmagnetic metal layer formed between the first soft magnetic layer and the second soft magnetic layer is formed only in the sense area, the sense area wherein the spin valve magnetoresistance effect is caused can be defined precisely by the nonmagnetic metal layer forming region. As a result, noise generated by the magnetic field entering into the peripheral area of the sense area can be reduced.

In addition, according to the seventh embodiment, since the film thickness on both sides of the sense area in the nonmagnetic metal layer formed between the first soft magnetic layer and the second soft magnetic layer is made thick, the spin valve magnetoresistance effect is scarcely caused on both sides of the sense area, and the sense area can be defined with accuracy by the forming region of the thin nonmagnetic metal layer. As a result, noise generated by the magnetic filed entering into the peripheral area of the sense area can be reduced.

In this device, if the nonmagnetic metal layer formed on both sides of the sense area is formed thickly such that the nonmagnetic metal layer can be used as the lead electrode, the thinner spin valve magnetoresistive head may be formed.

Moreover, according to the third spin valve magnetoresistive head in the eighth and ninth embodiments of the present invention, since the first soft magnetic layer, on which the antiferromagnetic layer is not formed, of the first and second soft magnetic layers formed on and under the nonmagnetic metal layer is formed only in the sense area, the spin valve magnetoresistance effect is not caused on both sides of the sense area. Therefore, the sense area can be defined with accuracy by the forming region of the first nonmagnetic metal layer. As a result, noise generated by the magnetic filed entering into the peripheral area of the sense area can be reduced.

Tenth Embodiment

Figure 13A:
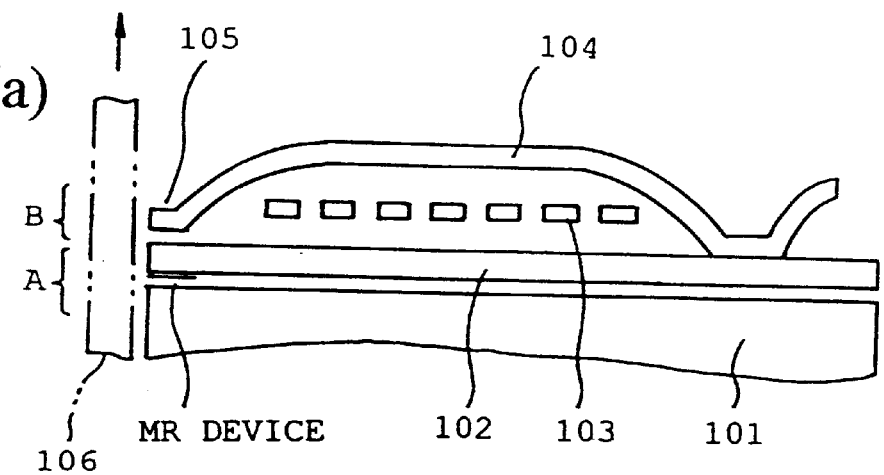
FIG. 13A is a sectional view showing a composite type MR head having therein the spin valve magnetoresistive head according to a tenth embodiment of the present invention.
Figure 13B:
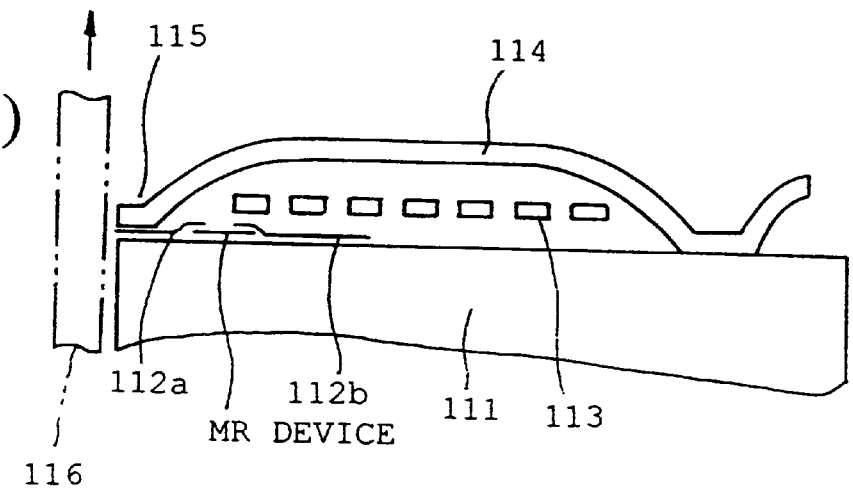
FIG. 13B is a sectional view showing an in-gap type MR head having therein the spin valve magnetoresistive head according to the tenth embodiment of the present invention.
Figure 13C:
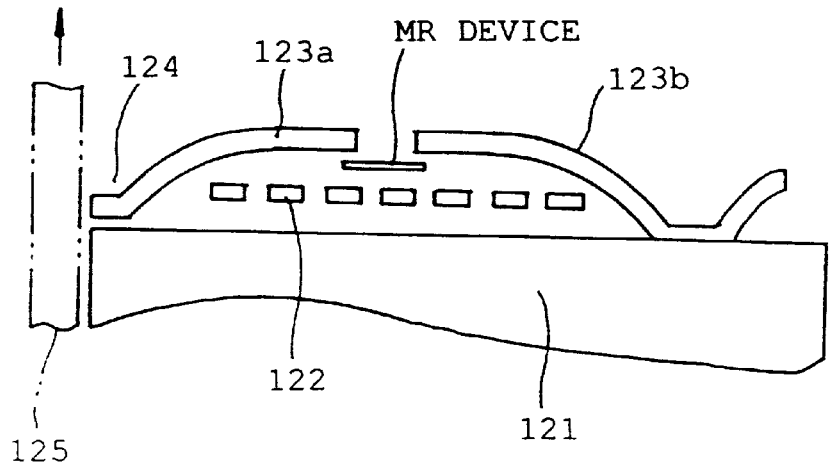
FIG. 13C is a sectional view showing a yoke type MR head having therein the spin valve magnetoresistive head according to the tenth embodiment of the present invention.

Next, with reference to FIGS. 13A to 13C, a magnetic recording apparatus according to the tenth embodiment of the present invention into which the MR device aforementioned is incorporated will be explained. FIGS. 13A to 13C are sectional views each showing a magnetic head portion of the magnetic recording apparatus and a magnetic recording medium.

FIG. 13A shows a composite type MR head. An A portion denotes a reproducing head, and a B portion denotes a recording head. A soft magnetic layer 102 is commonly used as a magnetic shield of the reproducing head and a magnetic pole of the recording head.

As shown in FIG. 13A, in the reproducing head portion, soft magnetic layers 101, 102 used as the magnetic shield are positioned at a distance so as to oppose to each other. The MR device described above is put into a gap of a portion 105 facing to a magnetic recording medium 106. A leakage magnetic field generated from the magnetic recording medium 106 can be directly detected.

In the reproducing head portion, soft magnetic layers 102, 104 used as the magnetic pole are positioned at a distance so as to oppose to each other. A coil 103 for generating magnetic flux flowing through the soft magnetic layers 102, 104 is formed in a gap between the soft magnetic layers 102, 104. By generating the leakage magnetic field from the gap of the facing portion 105 by this magnetic flux, the magnetic recording medium 106 can record various information.

According to this magnetic recording apparatus, since either one of the MR devices according to the first to ninth embodiments of the present invention is employed in the reproducing portion, distortion in an output characteristic of a change in electric resistance caused by the signal magnetic field can be eliminated. In addition, the width of the sense area for reading the signal magnetic field can be defined precisely, and the noise can be suppressed to enter into the reproducing electric signal.

FIG. 13B shows an in-gap type MR head with flux guides. As shown in FIG. 13B, soft magnetic layers 111, 114 used as the magnetic pole are positioned at a distance so as to oppose to each other. The MR device aforementioned is put into a gap of a portion 115 facing to a magnetic recording medium 116. A coil 113 for generating magnetic flux passing through the soft magnetic layers 111, 114 is formed in a gap between the soft magnetic layers 111, 114.

In order to avoid corrosion or direct contact to the magnetic recording medium, the MR device is positioned inside of the magnetic head not to be protruded to the portion 115 facing to the magnetic recording medium 116. A flux guide 112a which is electrically isolated from the MR device and magnetically coupled thereto is protruded to the facing portion 115. The leakage magnetic field generated by the magnetic recording medium 116 is entered into the flux guide 112a and then detected by the MR device. At the other end of the MR device, another flux guide 112b which is also electrically isolated from the MR device and magnetically coupled thereto is formed to guide the magnetic flux passed through the MR device to the soft magnetic layers 111, 114.

According to this magnetic recording apparatus, since either one of the MR devices according to the first to ninth embodiments of the present invention is employed in the reproducing portion, distortion in an output characteristic of a change in electric resistance caused by the signal magnetic field can be eliminated. Furthermore, the width of the sense area for reading the signal magnetic field can be defined with accuracy, and the noise can be suppressed to enter into the reproducing electric signal.

FIG. 13C shows a yoke type MR head. As shown in FIG. 13C, soft magnetic layers 121, 123a and 123b used as the magnetic pole are positioned at a distance so as to oppose to each other. A coil 122 for generating magnetic flux passing through the soft magnetic layers 121, 123a and 123b is formed in a gap between the soft magnetic layers 121, 123a and 123b. The MR device is positioned at ends of the soft magnetic layers 123a and 123b such that it is electrically isolated from the soft magnetic layers 123a and 123b and magnetically coupled thereto. The leakage magnetic field is generated from the gap of the facing portion 124 by the magnetic flux, which is generated by the coil 122 and is passed through the soft magnetic layers 121, 123a and 123b, to record various information on the magnetic recording medium 125.

Also, in this case, according to this magnetic recording apparatus, since either one of the MR devices according to the first to ninth embodiments of the present invention is utilized in the reproducing portion, distortion in an output characteristic of a change in electric resistance caused by the signal magnetic field can be eliminated. Moreover, the width of the sense area for reading the signal magnetic field can be defined with precise, and the noise can be suppressed to enter into the reproducing electric signal.

In the magnetic recording apparatus shown in FIGS. 13A to 13C, a substrate on which the magnetic head is formed and insulating films between the soft magnetic layers etc. are omitted.

Note that the MR device according to the present invention may be used in various magnetic recording apparatus in addition to the aforementioned magnetic recording apparatus equipped with the recording portion and the reproducing portion.

Moreover, the MR device may be used in a reproducing-only magnetic recording apparatus.

What is claimed is:

1. A magnetoresistive sensor with spin valve configuration for detecting by a sense current a change of resistance due to a signal magnetic field from a magnetic medium, said magnetoresistive sensor comprising:

a first soft magnetic layer;

a first nonmagnetic metal layer formed on said first soft magnetic layer;

a second magnetic layer formed on said first nonmagnetic metal layer and having a magnetization direction in a direction of passing-through of said sense current;

a second nonmagnetic metal layer formed on said second magnetic layer;

a third soft magnetic layer formed on said second nonmagnetic metal layer; and a sense current supplying layer for applying said sense current to at least said second magnetic layer;

wherein magnetization directions of said first and third soft magnetic layers are changed in response to said sense current while said magnetization direction of said second magnetic layer is changed in response to said signal magnetic field, any one of said first and third soft magnetic layers being oriented in a given direction which is approximately perpendicular to said direction of passing-through of said sense current and another one of said first and third soft magnetic layers being oriented in a direction approximately opposite to said given direction by a static magnetic coupling therebetween.

2. A magnetoresistive sensor according to claim 1, wherein said first nonmagnetic metal layer has larger specific resistance than that of said second nonmagnetic metal layer.

3. A magnetoresistive sensor according to claim 1, wherein said first soft magnetic layer is a film selected from a group consisting of an iron-nickel film, an iron film, and a cobalt amorphous film.

4. A magnetoresistive sensor according to claim 1, wherein said first soft magnetic layer is an iron-nickel film containing at least one selected from a group consisting of chromium, niobium, molybdenum, and vanadium.

5. A magnetoresistive sensor according to claim 1, wherein said first soft magnetic layer is a single film formed of one of cobalt and nickel.

6. A magnetoresistive sensor according to claim 1, wherein said first soft magnetic layer is an alloy film containing at least one of cobalt and nickel.

7. A magnetoresistive sensor according to claim 1, wherein said first nonmagnetic metal layer and said second nonmagnetic metal layer are a film having smaller specific resistance than that of each of said first soft magnetic layer, said second magnetic layer and said third soft magnetic layer, and a product of saturation magnetization and a film thickness of said first soft magnetic layer has a value identical to or very close to a product of saturation magnetization and a film thickness of said third soft magnetic layer.

8. A magnetoresistive sensor according to claim 7, wherein each of said first nonmagnetic metal layer and said second nonmagnetic metal layer is a film formed of the same material, and has the same volume.

9. A magnetic recording apparatus comprising a magnetoresistive sensor set forth in claim 1.

* * * * *